「有」

US010226699B2

(12) United States Patent
Miyamoto

(10) Patent No.: US 10,226,699 B2
(45) Date of Patent: Mar. 12, 2019

(54) COMPUTER-READABLE STORAGE MEDIUM HAVING GAME PROGRAM STORED THEREIN, AND GAME APPARATUS

(71) Applicant: NINTENDO CO., LTD., Kyoto-shi, Kyoto (JP)

(72) Inventor: Shigeru Miyamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/208,732

(22) Filed: Jul. 13, 2016

(65) Prior Publication Data

US 2016/0317927 A1 Nov. 3, 2016

Related U.S. Application Data

(63) Continuation of application No. 12/216,172, filed on Jun. 30, 2008, now Pat. No. 9,421,467.

(30) Foreign Application Priority Data

Jul. 4, 2007 (JP) ................................ 2007-176668

(51) Int. Cl.
*A63F 13/497* (2014.01)
*A63F 13/822* (2014.01)
(Continued)

(52) U.S. Cl.
CPC ............ *A63F 13/497* (2014.09); *A63F 13/10* (2013.01); *A63F 13/537* (2014.09);
(Continued)

(58) Field of Classification Search
None
See application file for complete search history.

(56) References Cited

U.S. PATENT DOCUMENTS 5,261,820 A * 11/1993 Slye ........................ A63F 13/10
273/237
6,691,032 B1 2/2004 Irish et al.
(Continued)

FOREIGN PATENT DOCUMENTS

EP 1 002 561 5/2000
EP 1 149 614 10/2001
(Continued)

OTHER PUBLICATIONS

Huynh-Thu, Sep. 26-29, 2010, 2010 IEEE 1 J1h International Conference on Image Processing, "Video Quality Assessment: From 20 to 30—Challenges and future trends."
(Continued)

*Primary Examiner* — Damon Pierce
(74) *Attorney, Agent, or Firm* — Nixon & Vanderhye PC

(57) ABSTRACT

Approach moving image storage means 10, 12 stores, in a predetermined storage section, display data used for displaying an approach moving image representing an approach method for a predetermined scene in the game, so as to associate the display data with the predetermined scene. Game process means S21 performs the game process, and display process means displays a game image on a display device. Moving image display instruction means S16, S17 receives an input made by a user for providing an instruction for displaying the approach moving image, and game scene determination means S31, S32 determines a scene in the game when the moving image display instruction means receives the input from the user. Moving image display means S36 reads, from the predetermined storage section, the approach moving image associated with the scene determined by the game scene determination means, and displays the approach moving image on the display device.

17 Claims, 22 Drawing Sheets

| 131 | 1311 | 1312 | 1313 | 1314 | 1315 |
|---|---|---|---|---|---|
| SCENE NUMBER | START POINT | END POINT | DIGEST SAVED-DATA NAME | INTRODUCTION MOVIE | |
| 001 | GAME START | TO CLEARING OF PUZZLE 1 | DIGEST SAVED-DATA 1 | INTRODUCTION MOVIE 1 | |
| 002 | AFTER PUZZLE 1 IS CLEARED | TO CLEARING OF PUZZLE 2 | DIGEST SAVED-DATA 2 | INTRODUCTION MOVIE 2 | |
| 003 | AFTER PUZZLE 2 IS CLEARED | TO EVENT 1 | DIGEST SAVED-DATA 3 | INTRODUCTION MOVIE 3 | |
| 004 | AFTER EVENT 1 | UP TO ENTRANCE TO CAVE | DIGEST SAVED-DATA 4 | INTRODUCTION MOVIE 4 | |
| : | : | : | : | : | |

(51) Int. Cl.
*A63F 13/40* (2014.01)
*A63F 13/537* (2014.01)
(52) U.S. Cl.
CPC ...... *A63F 13/822* (2014.09); *A63F 2300/206* (2013.01); *A63F 2300/634* (2013.01); *A63F 2300/636* (2013.01); *A63F 2300/807* (2013.01)

(56) References Cited

U.S. PATENT DOCUMENTS

| | | | |
|---|---|---|---|
| 2001/0049301 A1* | 12/2001 | Masuda | A63F 13/10 463/33 |
| 2002/0016205 A1 | 2/2002 | Nagata et al. | |
| 2003/0008705 A1 | 1/2003 | Baerlocher et al. | |
| 2003/0216177 A1 | 11/2003 | Aonuma et al. | |
| 2004/0087363 A1 | 5/2004 | Bogenn | |
| 2004/0166935 A1 | 8/2004 | Gavin et al. | |
| 2007/0060359 A1 | 3/2007 | Smith | |
| 2007/0099684 A1 | 5/2007 | Butterworth | |
| 2007/0298878 A1 | 12/2007 | Short | |

FOREIGN PATENT DOCUMENTS

| | | |
|---|---|---|
| JP | 2002-52256 | 2/2002 |
| JP | 2002-191868 | 7/2002 |
| JP | 2002-200351 | 7/2002 |
| JP | 2005-192689 | 7/2005 |
| WO | WO 2006/138535 | 12/2006 |

OTHER PUBLICATIONS

Office Communication dated May 24, 2018 for European Patent Application No. 08011521.5 (10 pages).
"Developing your own replay system" published on Feb. 4, 2004, http://www.gamasutra.com/view/feature/130442/developing_your_own_replay_system.php (8 pgs.).
Office Communication (result of consultation) dated Oct. 25, 2018 for the European Patent Application No. 08011521.5 (related to the U.S. Appl. No. 15/208,732) (3 pgs.).

* cited by examiner

FIG. 3
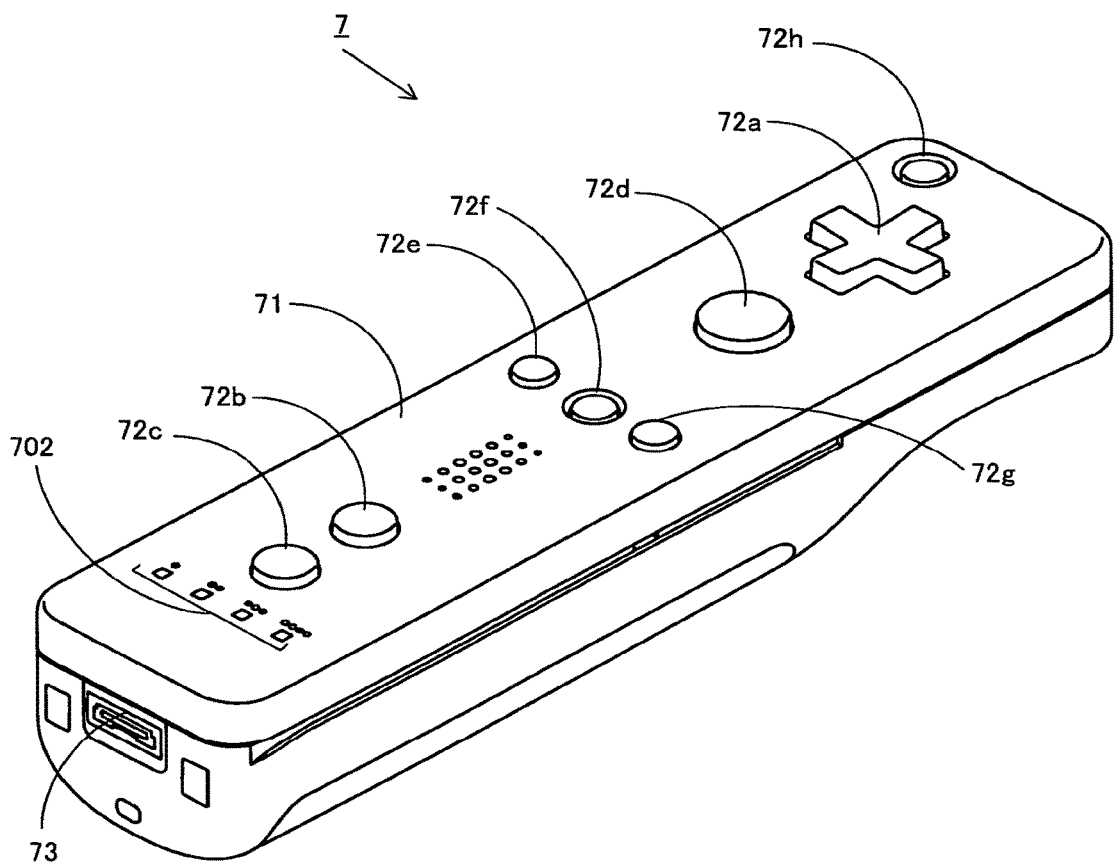
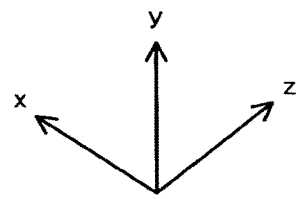

F I G. 4
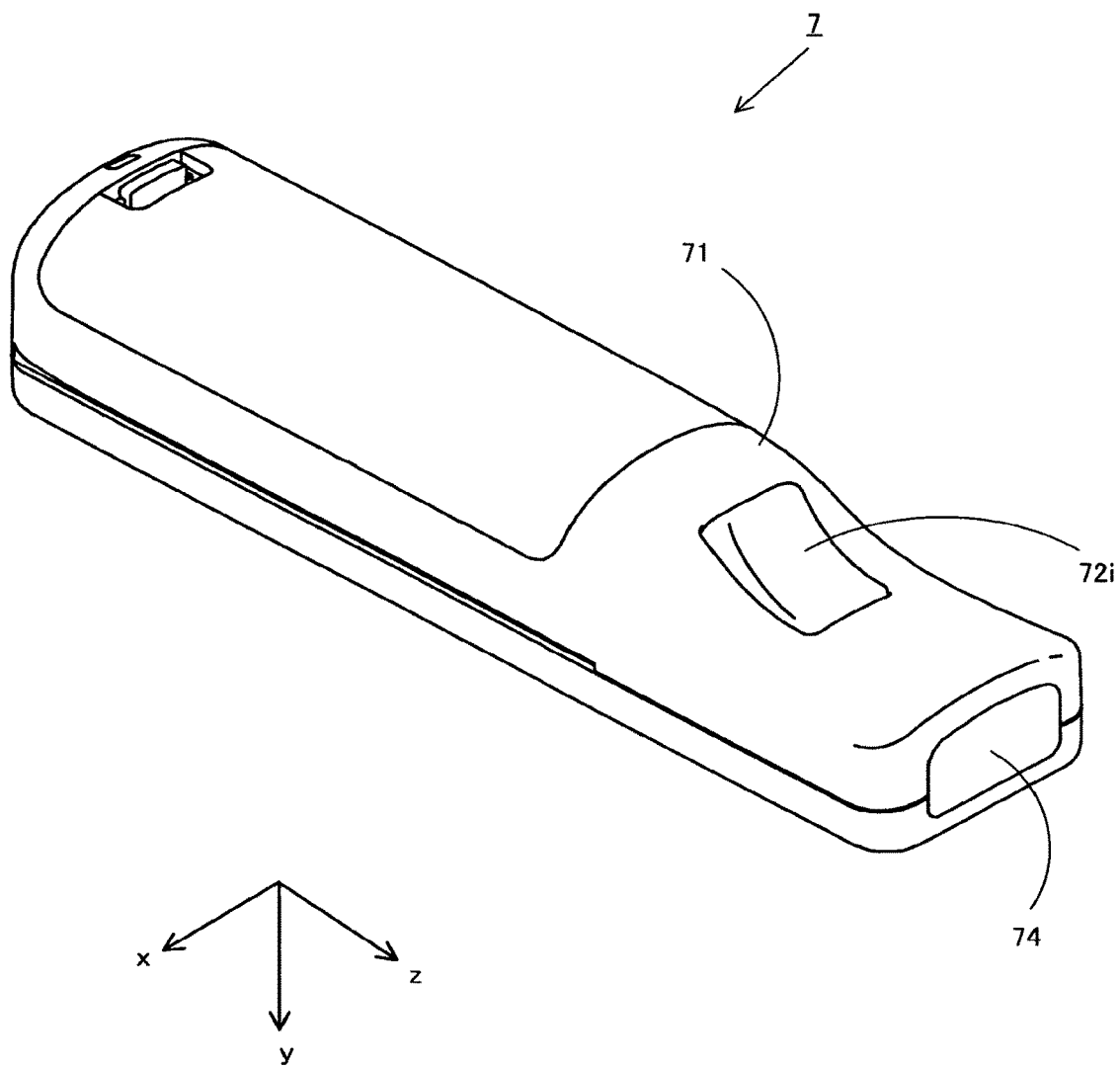

| | | LOCATION | PUZZLE NUMBER | PUZZLE CONTENT | APPROACH MOVIE NAME | SCENE NUMBER |
|---|---|---|---|---|---|---|
| ○○ AREA | ○○ VILLAGE | HOUSE OF VILLAGE HEAD | 001 | PUZZLE 1 | APPROACH MOVIE 1 | 001 |
| | | STONE MONUMENT | 002 | PUZZLE 2 | APPROACH MOVIE 2 | 002 |
| | ×× CAVE | FIRST LEVEL | 003 | PUZZLE 3 | APPROACH MOVIE 3 | 005 |
| | | FIRST UNDERGROUND LEVEL | 004 | PUZZLE 4 | APPROACH MOVIE 4 | 006 |
| | | SECOND UNDERGROUND LEVEL | 005 | PUZZLE 5 | APPROACH MOVIE 5 | 008 |
| △△ AREA | △△ PLAINS | TREE OF □ | 006 | PUZZLE 6 | APPROACH MOVIE 6 | 010 |
| | | △ STONE | 007 | PUZZLE 7 | APPROACH MOVIE 7 | 012 |
| | ◇◇ TOWER | FIRST LEVEL | 008 | PUZZLE 8 | APPROACH MOVIE 8 | ⋮ |
| | | SECOND FLOOR | 009 | PUZZLE 9 | APPROACH MOVIE 9 | ⋮ |
| | | THIRD FLOOR | 010 | PUZZLE 10 | APPROACH MOVIE 10 | ⋮ |
| ⋮ | □□ TEMPLE | ENTRANCE | ⋮ | ⋮ | ⋮ | ⋮ |
| | | ⋮ | ⋮ | ⋮ | ⋮ | ⋮ |
| | ⋮ | ⋮ | ⋮ | ⋮ | ⋮ | ⋮ |

| APPROACH MOVIE NAME | MOVIE CONTENT |
|---|---|
| APPROACH MOVIE 01 | ... |
| APPROACH MOVIE 02 | ... |
| APPROACH MOVIE 03 | ... |
| ⋮ | ⋮ |

| 129 | | |
|---|---|---|
| REPRODUCTION FROM-TIME (1291) | REPRODUCTION TO-TIME (1292) | DIGEST SAVED-DATA NAME (1293) |
| 0:00:00 | 0:01:00 | DIGEST SAVED-DATA 01 |
| 0:01:00 | 0:02:00 | DIGEST SAVED-DATA 02 |
| 0:02:00 | 0:03:30 | DIGEST SAVED-DATA 03 |
| 0:03:30 | 0:05:00 | DIGEST SAVED-DATA 04 |
| 0:05:00 | 0:07:00 | DIGEST SAVED-DATA 05 |
| 0:07:00 | 0:09:20 | DIGEST SAVED-DATA 06 |
| ⋮ | ⋮ | ⋮ |

FIG. 22

| 130 | |
|---|---|
| DIGEST SAVED-DATA NAME (1301) | DATA CONTENT (1302) |
| DIGEST SAVED-DATA 01 | ⋯ |
| DIGEST SAVED-DATA 02 | ⋯ |
| DIGEST SAVED-DATA 03 | ⋯ |
| ⋮ | ⋮ |

FIG. 23

| 131 | | | | |
|---|---|---|---|---|
| SCENE NUMBER (1311) | START POINT (1312) | END POINT (1313) | DIGEST SAVED-DATA NAME (1314) | INTRODUCTION MOVIE (1315) |
| 001 | GAME START | TO CLEARING OF PUZZLE 1 | DIGEST SAVED-DATA 1 | INTRODUCTION MOVIE 1 |
| 002 | AFTER PUZZLE 1 IS CLEARED | TO CLEARING OF PUZZLE 2 | DIGEST SAVED-DATA 2 | INTRODUCTION MOVIE 2 |
| 003 | AFTER PUZZLE 2 IS CLEARED | TO EVENT 1 | DIGEST SAVED-DATA 3 | INTRODUCTION MOVIE 3 |
| 004 | AFTER EVENT 1 | UP TO ENTRANCE TO CAVE | DIGEST SAVED-DATA 4 | INTRODUCTION MOVIE 4 |
| ⋮ | ⋮ | ⋮ | ⋮ | ⋮ |

COMPUTER-READABLE STORAGE MEDIUM HAVING GAME PROGRAM STORED THEREIN, AND GAME APPARATUS

CROSS REFERENCE TO RELATED APPLICATION

This application is a continuation of U.S. patent application Ser. No. 12/216,172, filed Jun. 30, 2008, now allowed, which claims priority to Japanese Patent Application No. 2007-176668, filed Jul. 4, 2007, the entire contents of each of which are hereby incorporated by reference.

BACKGROUND

Field of the Technology

The present technology relates to a computer-readable storage medium having a game program stored therein and a game apparatus, and more particularly to a computer-readable storage medium having stored therein a game program executed by a computer of a game apparatus which performs a game process in accordance with an operation input from a user so as to allow a game play, and a game apparatus.

Description of the Background Art

Conventionally, multiple types of video games have been played by using video game apparatuses. The video games include a role playing game, an action adventure game, and an action role playing game.

In these games, a core story or scenario is previously set, and the game is played in accordance with the story or the scenario in general. However, in some of these games, a volume of the story or the scenario is too large, and therefore a lot of time is needed for clearing the game. Further, in some cases, various puzzles are set in the scenario, and/or a skilled action (operation to be performed by a player) and the like are required, so as to enhance an interest in the game. However, there is a problem that these puzzles and the like are too difficult, and therefore the game may be stuck halfway, and the game may not be cleared to the end. As means for solving the problem, disclosed is a game control method for lowering the difficulty level of a game by presenting, while the game is being played, a hint for allowing the game to be continued (for example, Japanese Laid-Open Patent Publication No. 2002-200351). In the game control method, in a case where a character that is allowed to perform a particular action is not in a party (a group to which a player character operated by a player belongs), a hint message is presented when a position at which the particular action can be performed is approached.

However, the game control method disclosed in Japanese Laid-Open Patent Publication No. 2002-200351 described above has the following problem. Specifically, in the game control method disclosed in Japanese Laid-Open Patent Publication No. 2002-200351, the hint is always presented when a certain condition is satisfied. Therefore, a player who desires to clear a game by solving a puzzle by him/herself may reduce his/her interest in the game because the hint for solving the puzzle is presented without allowing the player to think by him/herself. Further, there is another problem that a simple presentation of a message does not interest a player.

SUMMARY

Therefore, a feature of an example embodiment presented herein is to provide a game program and a game apparatus for providing approach information only when a player needs the information, and allowing the player to play and clear a game to the end. Another object of the present invention is to provide approach information so as to make a game more enjoyable to a user.

The present embodiment has the following features. The reference numerals, the supplementary description and the like in the parentheses indicate an exemplary correspondence with the embodiment described below in order to aid in understanding the present embodiment and are not intended to limit, in any way, the scope of the present embodiment.

A first aspect is directed to a computer-readable storage medium having stored therein a game program executed by a computer of a game apparatus for performing a game process in accordance with a user making an operation input so as to play a game, and the computer is caused to function as: approach moving image storage means (10, 12); game process means (S21); display process means (S15); moving image display instruction means (S16, S17); game scene determination means (S31, S32); and moving image display means (S36). The approach moving image storage means stores, in a predetermined storage section, display data used for displaying an approach moving image representing an approach method for a predetermined scene in the game, so as to associate the display data with the predetermined scene. The game process means performs the game process. The display process means displays a game image on a display device. The moving image display instruction means receives an input made by a user for providing an instruction for displaying the approach moving image. The game scene determination means determines a scene in the game when the moving image display instruction means receives the input from the user. The moving image display means reads, from the predetermined storage section, the approach moving image associated with the scene determined by the game scene determination means, and displays the approach moving image on the display device.

According to the first aspect, a moving image indicating the approach method for a predetermined scene in a game can be reproduced based on an instruction operation from a player. Therefore, the game may not become stuck, and the game can be played to the end.

In a second aspect, the moving image display means displays the approach moving image in a part of a display area of the display device by superimposing the approach moving image on the game image displayed by the display process means.

According to the second aspect, the approach moving image and the game image are simultaneously displayed, and therefore the approach method can be presented such that a player can more easily know the approach method. Further, a player is allowed to perform operation while viewing the approach moving image.

In a third aspect, the moving image display means displays the approach moving image with an image quality lower than an image quality of the game image displayed by the display process means.

According to the third aspect, the "visual quality" of the approach moving image is reduced as compared to an actual game screen, and therefore a player is prevented from being satisfied with the game by viewing the approach moving image, and, for example, the player is caused to think that the player needs to operate and clear the game by him/herself, so that the player may keep his/her motivation for the game play.

In a fourth aspect, the program causes the computer to further function as connection means and approach moving image reception means.

The connection means connects the game apparatus through a network to a predetermined server in which the approach moving image is stored. The approach moving image reception means receives the approach moving image from the predetermined server through the connection means. Further, the approach moving image storage means stores, in the predetermined storage section, the approach moving image received from the predetermined server by the approach moving image reception means.

According to the fourth aspect, it is possible to separately distribute the approach moving image. Therefore, it is possible to generate and prepare the approach moving image in a flexible manner. Further, it is possible to reduce time-consuming development for the game program to be supplied as a product, a file size of the game program, and the like.

In a fifth aspect, the program causes the computer to further function as time period measurement means for measuring a time period from a predetermined time point to a time at which the game process is being currently performed. Further, the moving image display means displays the approach moving image only when the time period measured by the time period measurement means represents a value greater than a predetermined value.

According to the fifth aspect, reduction in interest in the game due to all the approach information being allowed to be referred to from the beginning can be prevented.

A sixth aspect is directed to a game apparatus for performing a game process in accordance with a user making an operation input so as to play a game, and the game apparatus comprises: approach moving image storage means (10, 12); game process means (10): display process means (10): moving image display instruction means (10): game scene determination means (10); and moving image display means (10). The approach moving image storage means stores display data used for displaying an approach moving image representing an approach method for a predetermined scene in the game, so as to associate the display data with the predetermined scene. The game process means performs the game process. The display process means displays a game image on a display device. The moving image display instruction means receives an input made by a user for providing an instruction for displaying the approach moving image. The game scene determination means determines a scene in the game when the moving image display instruction means receives the input from the user. The moving image display means reads, from a predetermined storage section, the approach moving image associated with the scene determined by the game scene determination means, and displays the approach moving image on the display device.

According to the sixth aspect, the same effect as that of the first aspect can be obtained.

A seventh aspect is directed to a computer-readable storage medium having stored therein a game program executed by a computer of a game apparatus for performing a game process for operating a player character in accordance with a user making an operation input so as to play a game, and the computer is caused to function as: approach operation data storage means (10, 12); game process means (S21); display process means (S15); moving image display instruction means (S16, S17); game scene determination means (S31, S32); and moving image display means (S36). The approach operation data storage means (10, 12) stores, in a predetermined storage section, operation data corresponding to an approach method for a predetermined scene in the game so as to display an approach moving image indicating the approach method, the operation data being associated with the predetermined scene. The game process means (S21) performs the game process. The display process means (S15) displays a game image on a display device. The moving image display instruction means (S16, S17) receives an input made by a user for providing an instruction for displaying the approach moving image. The game scene determination means (S31, S32) determines a scene in the game when the moving image display instruction means receives the input from the user. The moving image display means (S36) reads, from the predetermined storage section, the operation data associated with the scene determined by the game scene determination means, and moves and displays on the display device the player character in accordance with the operation data.

In an eighth aspect, the moving image display means displays the approach moving image in a part of a display area of the display device by superimposing the approach moving image on the game image displayed by the display process means.

In a ninth aspect, the moving image display means displays the approach moving image with an image quality lower than an image quality of the game image displayed by the display process means.

In a tenth aspect, the program causes the computer to further function as: connection means for connecting through a network to a predetermined server in which the operation data corresponding to the approach method is stored; and approach operation data reception means for receiving the operation data corresponding to the approach method, from the predetermined server through the connection means. The approach operation data storage means stores, in the predetermined storage section, the operation data received from the predetermined server by the approach operation data reception means.

In an eleventh aspect based on the seventh aspect, the program causes the computer to further function as time period measurement means for measuring a time period from a predetermined time point to a time at which the game process is being currently performed. The moving image display means moves and displays on the display device the player character in accordance with the operation data only when the time period measured by the time period measurement means represents a value greater than a predetermined value.

A twelfth aspect is directed to a game apparatus for performing a game process for operating a player character in accordance with a user making an operation input so as to play a game, and the game apparatus comprises: approach operation data storage means (10, 12); game process means (10); display process means (10); moving image display instruction means (10), game scene determination means (10); and moving image display means (10). The approach operation data storage means (10, 12) stores, in a predetermined storage section, operation data corresponding to an approach method for a predetermined scene in the game so as to display an approach moving image indicating the approach method, the operation data being associated with the predetermined scene. The game process means (10) performs the game process. The display process means (10) displays a game image on a display device. The moving image display instruction means (10) receives an input made by a user for providing an instruction for displaying the approach moving image. The game scene determination means (10) determines a scene in the game when the moving image display instruction means receives the input from the user. The moving image display means (10) reads, from the predetermined storage section, the operation data associated with the scene determined by the game scene determination means, and moves and displays on the display device the player character in accordance with the operation data.

According to the seventh to the twelfth aspects, the same effects as those of the first to the sixth aspects, respectively, can be obtained.

According to the present embodiment, it is possible to reproduce, as a moving image, approach information for a predetermined scene in a game in accordance with an instruction operation from a player. Thus, a player may not become stuck with the game, and therefore a player unaccustomed to a game or a player that does not have a lot of time for playing a game may play the game to the end (until the game is cleared or the game ends). Further, the approach information is displayed as an actual example by using "moving image", and therefore how to actually move (operate) a player character can be indicated to a player, for certain.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 3 is a perspective view of a controller 7 shown in FIG. 1 as viewed from the top rear side thereof;

FIG. 4 is a perspective view of the controller 7 shown in FIG. 3 as viewed from the bottom front side thereof;

FIG. 18 is a diagram illustrating an exemplary data structure of a puzzle table 126;

FIG. 19 is a diagram illustrating an exemplary data structure of an approach movie 127;

FIG. 21 is a diagram illustrating an exemplary data structure of a digest movie correspondence table 129;

FIG. 22 is a diagram illustrating an exemplary data structure of a digest saved-data 130;

FIG. 23 is a diagram illustrating an exemplary data structure of a scene table 131;

DESCRIPTION OF THE PREFERRED EMBODIMENTS

Hereinafter, an embodiment will be described with reference to the drawings. Note that the present embodiment is not limited to this embodiment.

(Entire Structure of Game System)

Figure 1:
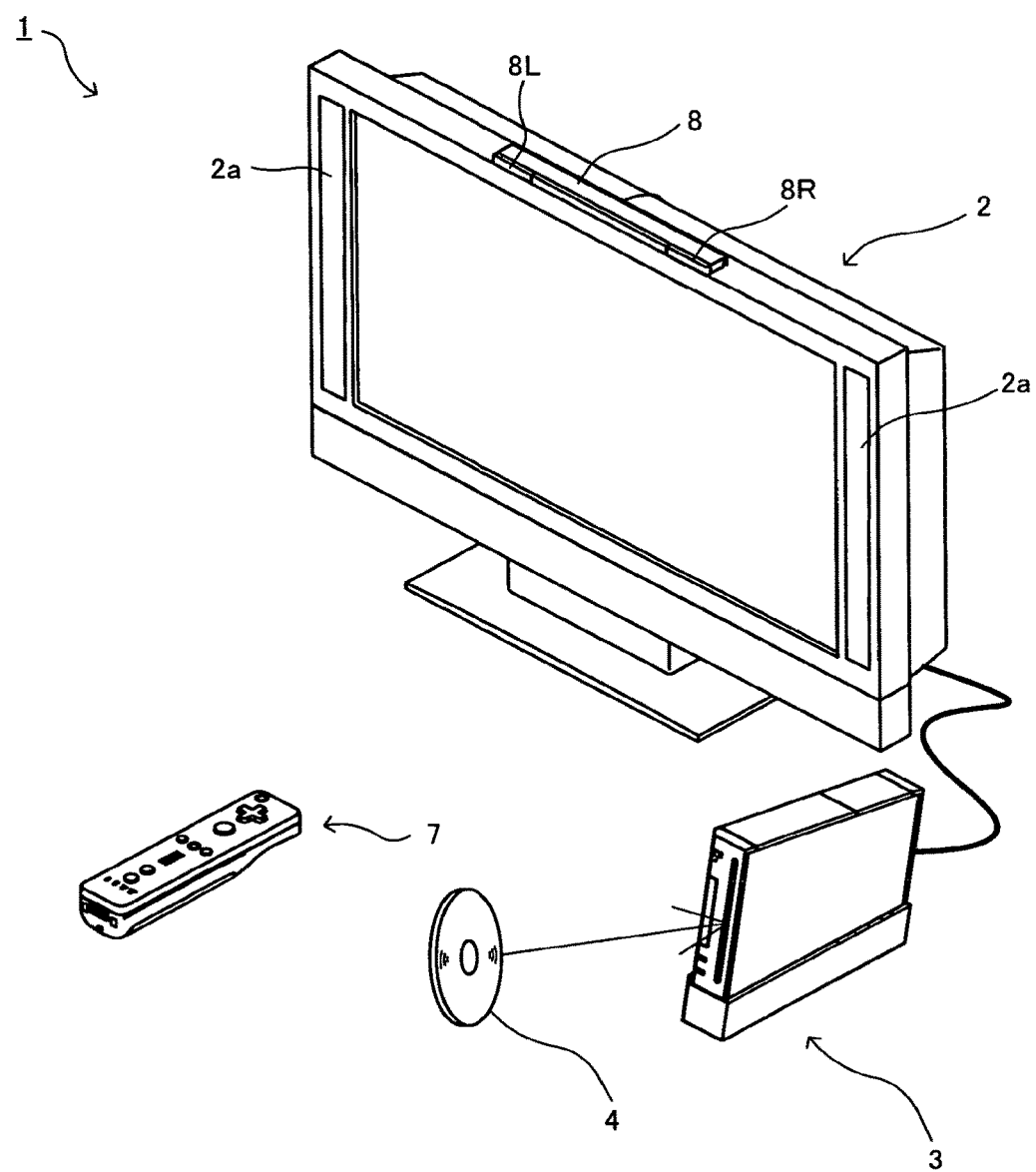
FIG. 1 is an external view illustrating a game system 1 according to an embodiment.

With reference to FIG. 1, a game system 1 including a game apparatus according to an embodiment will be described. FIG. 1 is an external view of the game system 1. In the following description, a stationary game apparatus is taken as an example for describing a game apparatus and a game program of the present embodiment.

As shown in FIG. 1, the game system 1 includes a television receiver (hereinafter, simply referred to as a "television") 2, a game apparatus body 3, an optical disc 4, a controller 7, and a marker section 8. In this system, the game apparatus body 3 performs game process based on a game operation using the controller 7.

In the game apparatus body 3, the optical disc 4 typifying an information storage medium used for the game apparatus body 3 in an exchangeable manner is detachably inserted. A game program executed by the game apparatus body 3 is stored in the optical disc 4. The game apparatus body 3 has, on the front surface thereof, an insertion opening for the optical disc 4. The game apparatus body 3 reads and executes the game program stored in the optical disc 4 which is inserted through the insertion opening, so as to perform the game process.

The game apparatus body 3 is connected to the television 2, which is an exemplary display device, through a connecting cord. A game image obtained as a result of the game process performed by the game apparatus body 3 is displayed on the television 2. Further, the marker section 8 is provided on the periphery (in FIG. 0.1, on a portion above a screen) of a screen of the television 2. The marker section 2 includes two markers 8R and 8L on both ends thereof. Specifically, the marker 8R (as well as the marker 8L) includes one or more infrared LED, and emits an infrared light forward from the television 2. The marker section 8 is connected to the game apparatus body 3, and the game apparatus body 3 is able to control each infrared LED of the marker section 8 so as to light each infrared LED up.

The controller 7 is an input device for providing the game apparatus body 3 with operation data representing a content of an operation performed on the controller 7 itself. Radio communication is made between the controller 7 and the game apparatus body 3. In the present embodiment, the radio communication between the controller 7 and the game apparatus body 3 is made by using, for example, the Bluetooth® technology. In another embodiment, connection between the controller 7 and the game apparatus body 3 may be a wired connection.

(Internal Structure of Game Apparatus Body 3)

Figure 2:
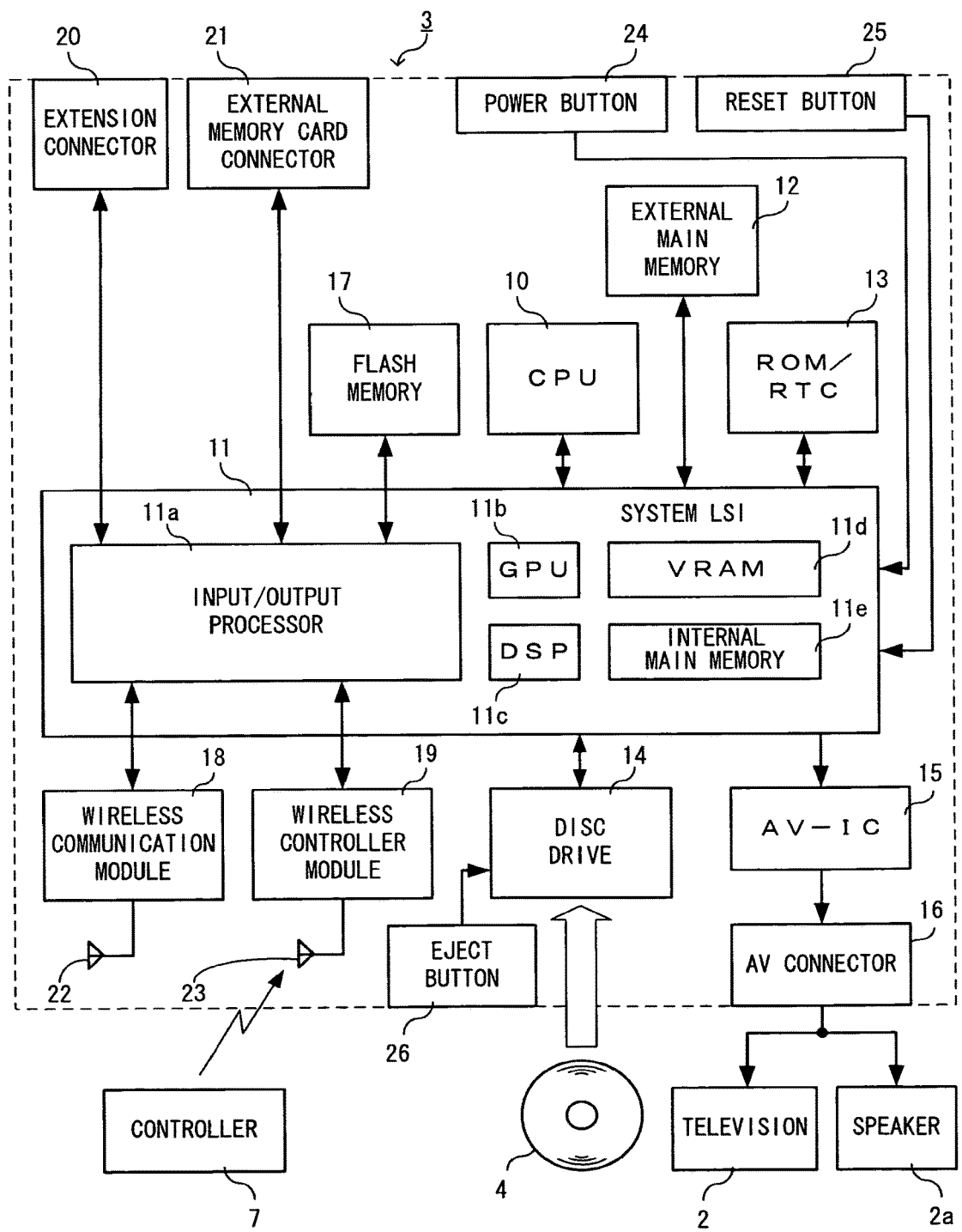
FIG. 2 is a functional block diagram of a game apparatus body 3 shown in FIG. 1.

Next, an internal structure of the game apparatus body 3 will be described with reference to FIG. 2. FIG. 2 is a block diagram illustrating a structure of the game apparatus body 3. The game apparatus body 3 includes the CPU 10, a system LSI 11, an external main memory 12, a ROM/RTC 13, a disk drive 14, an AV-IC 15, and the like.

The CPU 10, functioning as a game processor, performs game process by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (so-called a boot ROM) incorporating a boot program for the game apparatus body 3, and a clock circuit (RTC: Real Time Clock) for counting a time. The disk drive 14 reads program data, texture data, and the like from the optical disk 4, and writes the read data into an internal main memory 11e or the external main memory 12 described below.

Further, the system LSI 11 includes an input/output processor 11a, a GPU (Graphics Processor Unit) 11b, a DSP (Digital Signal Processor) 11c, a VRAM 11d, and the internal main memory 11e. These component 11a, 11b, 11c, 11d, and 11e are connected with each other through an internal bus, which is not shown.

The GPU 11b, acting as a part of rendering means, generates an image in accordance with a graphics command (rendering command) from the CPU 10. More specifically, the GPU 11b generates game image data by performing a calculation process necessary for displaying a 3D graphics in accordance with the graphics command, such as a process for coordinate transformation, from a 3D coordinate to a 2D coordinate, corresponding to a preprocessing for rendering, and a final rendering process such as texture mapping. The CPU 10 provides the GPU 11b with an image generation program necessary for generating the game image data in addition to with the graphics command. The VRAM 11d stores data (data such as polygon data and texture data) necessary for executing the graphics command. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12. Further, the internal main memory 11e as well as the external main memory 12 stores programs and various data, and the internal main memory 11e is also used as a work area and a buffer area for the CPU 10.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor (I/O processor) 11a performs data transmission to and data reception from the component connected thereto, and download of data from an external device. The input/output processor 11a is connected to the flash memory 17, a wireless communication module 18, a wireless controller module 19, an extension connector 20, and an external memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects for data which needs to be transmitted to the network, and transmits, when the data is detected, the data to the network through the wireless communication module 18 and the antenna 22. Further, the input/output processor 11a receives data transmitted from another game apparatus, and/or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the game apparatus body 3 in addition to data transmitted from the game apparatus body 3 to another game apparatus or the various servers, and data received by the game apparatus body 3 from another game apparatus or the various servers.

The input/output processor 11a receives operation data transmitted from the controller 7 through the antenna 23 and the wireless controller module 19, and (temporarily) stores the received operation data in a buffer area of the internal main memory 11e or the external main memory 12.

Further, the input/output processor 11a is connected to the extension connector 20 and the external memory card connector 21. The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The external memory card connector 21 is a connector for connecting thereto an external storage media such as a memory card. For example, the input/output processor 11a accesses an external storage media through the extension connector 20 or the external memory card connector 21 so as to store data or read data.

The game apparatus body 3 includes a power button 24, a reset button 25, and an eject button 26. The power button 24 and the reset button 25 are connected to the system LSI 11. When the power button 24 is on, power is supplied to the respective components of the game apparatus body 3 through an AC adaptor not shown. Further, when the power button 24 which is on is pressed, mode shifts to low-power standby mode. Also in this state, current flows through the game apparatus body 3, and therefore the game apparatus body 3 continues to be connected to a network such as the Internet. When the power needs to be switched from on to off, the power button 24 is pressed for a predetermined time period or longer, so that the power is switched off. When the reset button 25 is pressed, the system LSI 11 reboots a boot program of the game apparatus body 3. The eject button 26 is connected to the disk drive 14. When the eject button 26 is pressed, the optical disc 4 is ejected from the disk drive 14.

Next, with reference to FIGS. 3 and 4, the controller 7 will be described. FIG. 3 is a perspective view illustrating the controller 7 as viewed from the top rear side thereof. FIG. 4 is a perspective view illustrating the controller 7 as viewed from the bottom front side thereof.

As shown in FIG. 3 and FIG. 4, the controller 7 has a housing 71 and an operation section 72 including a plurality of operation buttons provided on the surface of the housing 71. In the present embodiment, the housing 71 has a generally parallelepiped shape extending in a longitudinal direction from front to rear, and the overall size of the housing 71 has such a size as to be held by one hand of an adult or even a child, and the housing 71 is formed by, for example, plastic molding.

At the center of a front part of a top surface of the housing 71, a cross key 72a is provided. The cross key 72a is a cross-shaped four-direction push switch, and includes operation portions corresponding to the four directions (front, rear, right and left), which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, indicate a direction in which a player character or the like appearing in a virtual game world is to move or indicates an option selected from a plurality of options.

Although the cross key 72a is an operation section for outputting an operation signal in accordance with the aforementioned direction input operation performed by a player, such an operation section may be provided in another form. For example, an operation section which includes four push switches so as to form a cross, and outputs an operation signal in accordance with a push switch pressed by a player may be provided. Further, an operation section including not only the four push switches but also a center switch provided at the center of the cross may be provided. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when a player presses a head thereof. The operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with respective operation functions in accordance with the game program executed by the game apparatus body 3. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus body 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing a player of the controller type which is currently set to controller 7 that he or she is using. Specifically, when the controller 7 transmits the transmission data to the receiving unit 6, one of the plurality of LEDs 702 corresponding to the controller type is lit up.

On the top surface of the housing 71, a sound hole for externally outputting a sound from a speaker (speaker 706 shown in FIG. 5), which will be described below, is provided between the operation buttons 72e, 72f, and 72g and the operation button 72b.

On a bottom surface of the housing 71, a recessed portion is formed. As described later in detail, the recessed portion provided on the bottom surface of the housing 71 is formed at a position at which an index finger or middle finger of the player is located when the player holds the controller 7 with one hand so as to face the front surface of the controller 7 to the markers 8L and 8R. On a slope surface of the recessed portion, an operation button 72i is provided. The operation button 72i is an operation section acting as, for example, a B button.

On a front surface of the housing 71, an image pickup element 743 included in the imaging information calculation section 74 is provided. The imaging information calculation section 74 is a system for analyzing image data taken by the controller 7 and detecting for the centroid, the size and the like of an area having a high brightness in the image data, and the imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, the connector 73 is provided. The connector 73 is, for example, an edge connector, and is used for, for example, engaging and connecting with a connecting cable.

Here, for making the below description specific, a coordinate system is defined for the controller 7. As shown in FIGS. 3 and 4, an x-axis, a y-axis and a z-axis, which are orthogonal to each other, are defined for the controller 7. Specifically, the longitudinal direction of the housing 71 corresponding to the front/rear direction of the controller 7 is defined as the z-axis direction, and a direction toward the front surface (the surface on which the imaging information calculation section 74 is mounted) of the controller 7 is defined as a z-axis positive direction. The up/down direction of the controller 7 is defined as the y-axis direction, and a direction toward the top surface (the surface on which the operation button 72a and the like are provided) of the housing 71 is defined as a y-axis positive direction. The left/right direction of the controller 7 is defined as the x-axis direction, and a direction toward the left side surface (the side surface which is not shown in FIG. 3 but shown in FIG. 4) of the housing 71 is defined as an x-axis positive direction.

Figure 5:
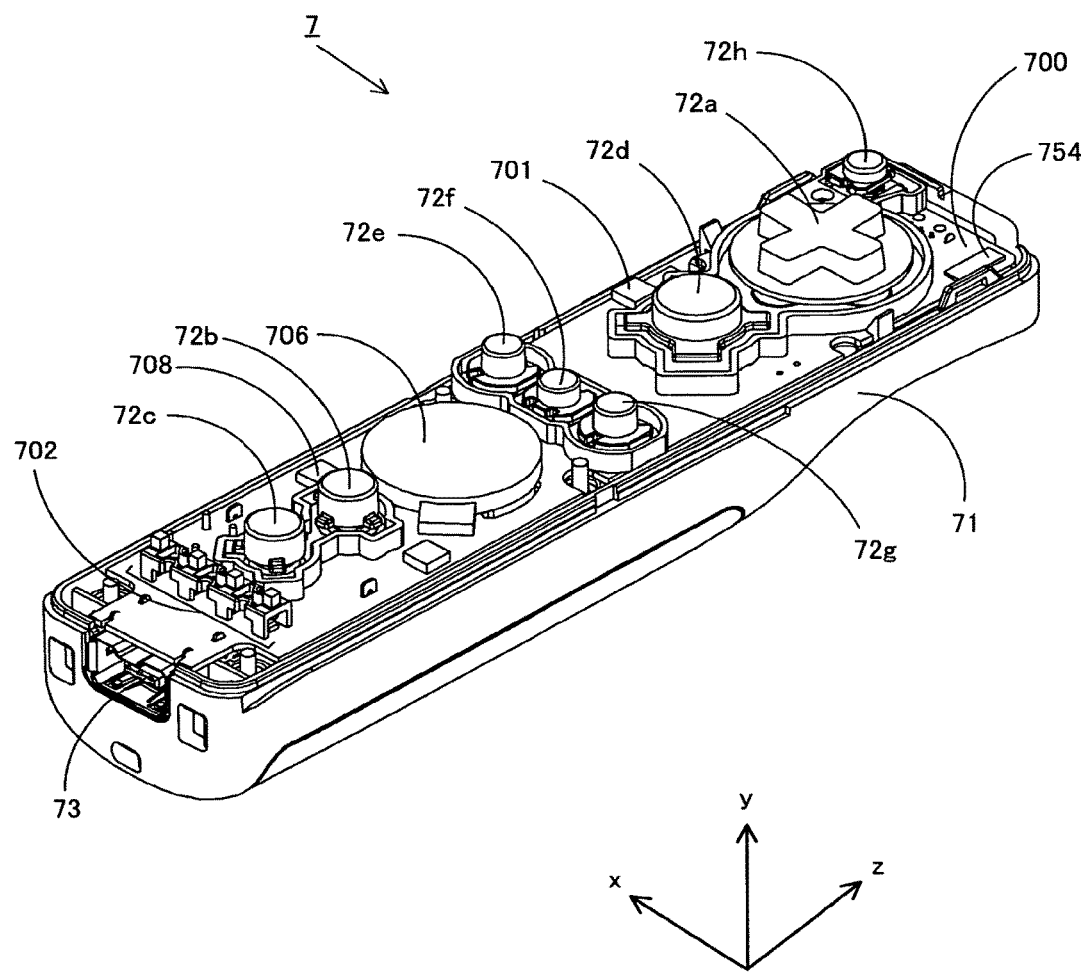
FIG. 5 is a perspective view illustrating a state where an upper housing of the controller 7 shown in FIG. 3 is removed.
Figure 6:
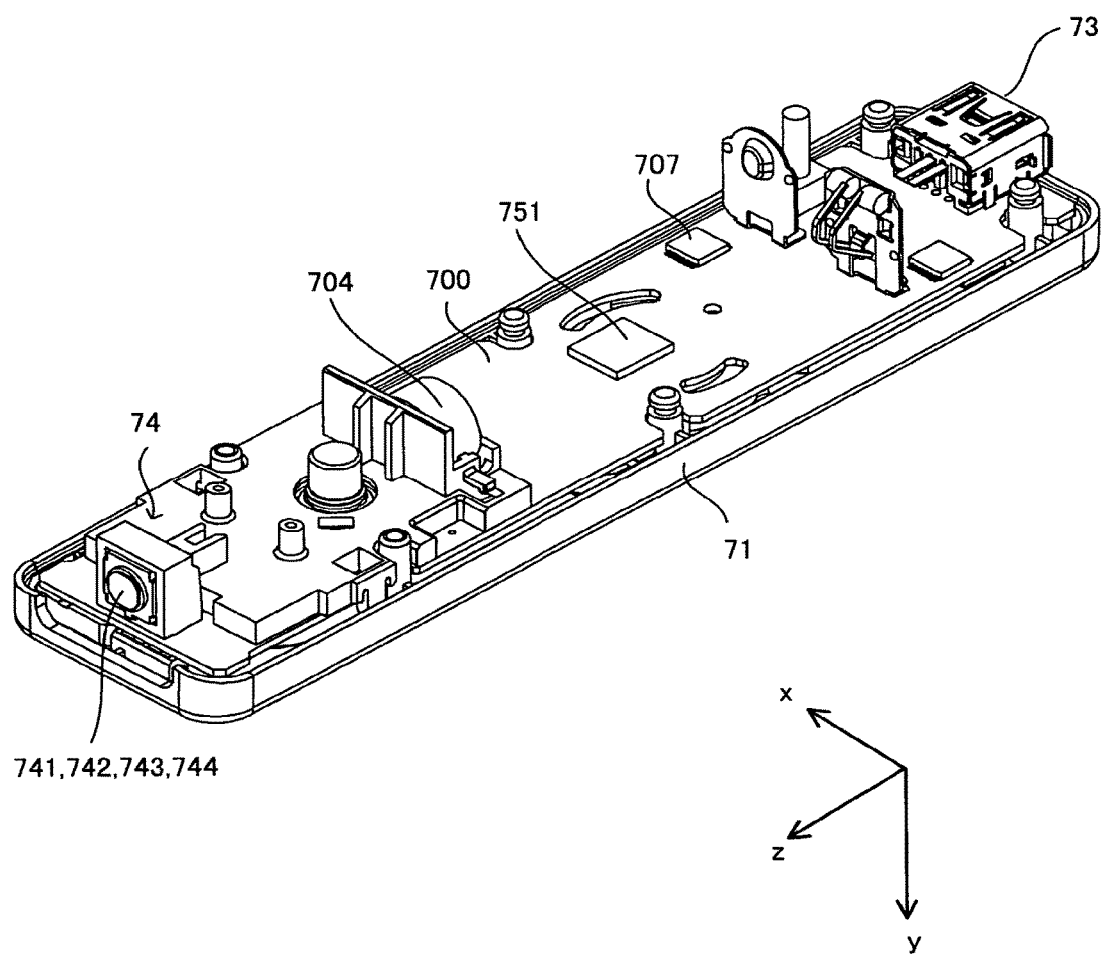
FIG. 6 is a perspective view illustrating a state where a lower housing of the controller 7 shown in FIG. 3 is removed.

With reference to FIGS. 5 and 6, an internal structure of the controller 7 will be described. FIG. 5 is a perspective view illustrating, as viewed from the rear surface side of the controller 7, a state where an upper housing (a part of the housing 71) of the controller 7 is removed. FIG. 6 is a perspective view illustrating, as viewed from the front surface side of the controller 7, a state where a lower housing (a part of the housing 71) of the controller 7 is removed. FIG. 6 is a perspective view illustrating a reverse side of a substrate 700 shown in FIG. 5.

As shown in FIG. 5, the substrate 700 is fixed inside the housing 71, and on a top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The microcomputer 751 functions as exemplary button data generation means of the present invention so as to generate operation button data in accordance with a type of the operation button 72a or the like. This mechanism is widely known, and, for example, is realized by the microcomputer 751 detecting for line contact or line disconnection, which is performed by using a switch mechanism such as a tact switch provided under a key top. More specifically, for example, when the operation button is pressed, a current flows by the line contact, and the microcomputer 751 detects for an operation button connected to a line through which the current flows, and generates a signal in accordance with the type of the operation button.

Further, the wireless module 753 (see FIG. 7) and the antenna 754 allow the controller 7 to act as a wireless controller. The quartz oscillator not shown, which is provided in the housing 71, generates a reference clock of the microcomputer 751 described later. On the top main surface of the substrate 700, the speaker 706 and an amplifier 708 are provided. The acceleration sensor 701 is provided on the substrate 700 to the left of the operation button 72d (that is, near the edge of the substrate 700 offset from the center thereof). Therefore, the acceleration sensor 701 can detect for a change of a direction of the gravitational acceleration and an acceleration containing a centrifugal force component, based on a rotation of the controller 7 about the longitudinal direction thereof, so that the game apparatus body 3 uses a predetermined calculation to determine the rotation of the controller 7 with favorable accuracy based on the acceleration data having been detected.

On the other hand, as shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707, which is connected to the microcomputer 751 and the amplifier 708 via lines formed on the substrate 700 and the like, outputs a sound signal to the speaker 706 via the amplifier 708 based on the sound data transmitted from the game apparatus body 3.

On the bottom main surface of the substrate 700, a vibrator 704 is provided. The vibrator 704 is, for example, a vibration motor or a solenoid. The vibrator 704 is connected to the microcomputer 751 via lines formed on the substrate 700 or the like such that the operation of the vibrator 704 is on or off in accordance with vibration data transmitted from the game apparatus body 3. The controller 7 is vibrated by an actuation of the vibrator 704, and the vibration is conveyed to the player's hand holding the controller 7, and thus a so-called vibration-feedback game is realized. The vibrator 704 is disposed slightly toward the front of the housing 71, thereby allowing the housing 71 held by the player to strongly vibrate, that is, allowing the player to easily feel the vibration.

Figure 7:
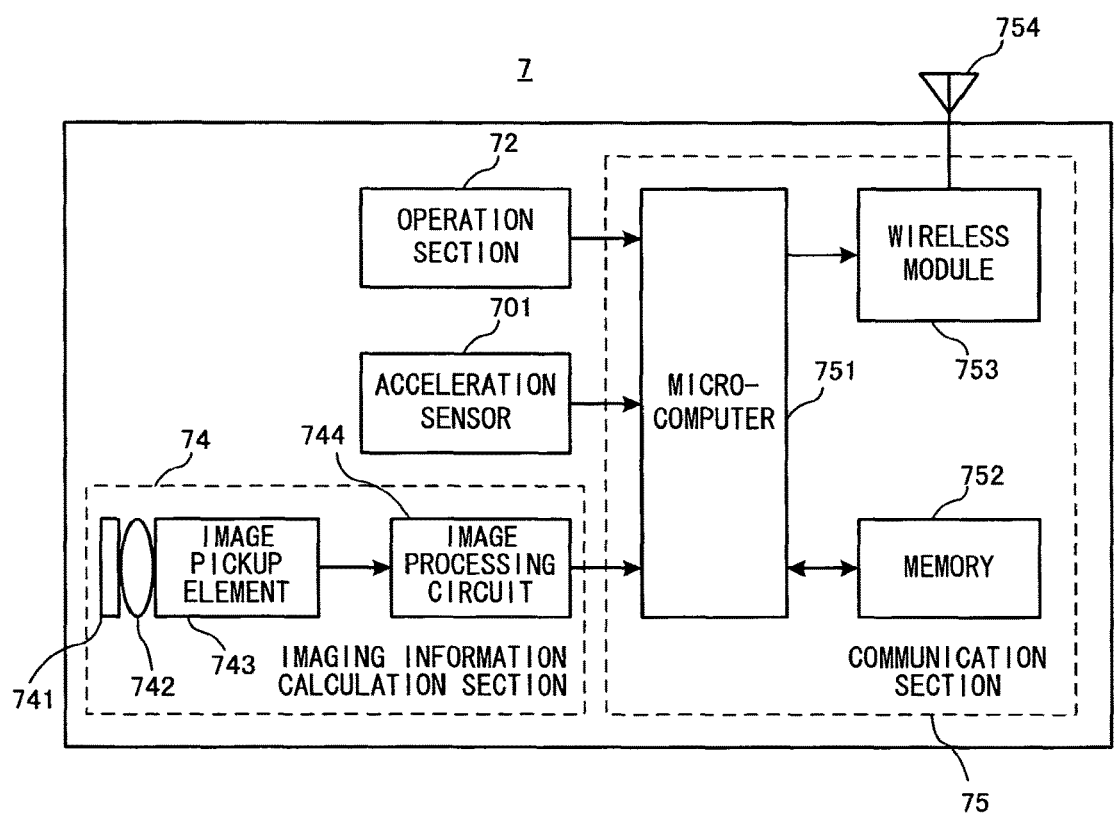
FIG. 7 is a block diagram illustrating a structure of the controller 7 shown in FIG. 3.

Next, with reference to FIG. 7, an internal structure of the controller 7 will be described. FIG. 7 is a block diagram illustrating the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state imaging device such as, for example, a CMOS sensor or a CCD, and takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs process result data representing position coordinates and the size of the identified spot to the communication section 75. The imaging information calculation section 74 is fixed to the housing 71 of the controller 7 and the imaging direction of the imaging information calculation section 74 can be changed by changing the direction of the housing 71. As described later in detail, a signal can be obtained in accordance with the position and the motion of the controller 7 based on the process result data outputted by the imaging information calculation section 74.

The controller 7 preferably includes a three-axis (x, y, and z-axes) acceleration sensor 701. The three axis acceleration sensor 701 detects for a linear acceleration in three directions, i.e., the up/down direction, the left/right direction, and the forward/backward direction. Alternatively, a two axis acceleration detection means which detects for only a linear acceleration along each of the up/down and left/right directions (or other pair of directions) may be used in another embodiment depending on the type of control signals used in the game process. For example, the three axis or the two axis acceleration sensor 701 may be of the type available from Analog Devices, Inc. or STMicroelectronics N.V. Preferably, the acceleration sensor 701 is of an electrostatic capacitance (capacitance-coupling) type that is based on silicon micro-machined MEMS (Micro Electro Mechanical Systems) technology. However, any acceleration detection means (e.g., piezoelectric type or piezoresistance type) now existing or any other suitable technology later developed may be used to provide the three axis or two axis acceleration sensor 701.

As one skilled in the art understands, the acceleration detection means, as used in the acceleration sensor 701, are capable of detecting for only acceleration (linear acceleration) along a straight line corresponding to each axis of the acceleration sensor. In other words, a direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, when a computer such as a processor (for example, the CPU 10) of the game apparatus or a processor (for example, the microcomputer 751) of the controller processes acceleration signals outputted from the acceleration sensor 701, additional information relating to the controller 7 can be inferred or calculated (determined), as one skilled in the art will readily understand from the description herein. For example, a case where it is anticipated that the computer will process the acceleration signals outputted from the acceleration sensor of the controller which is in a static state (that is, a case where it is anticipated that an acceleration detected by the acceleration sensor will include only a gravitational acceleration) will be described. When the controller is actually in the static state, it is possible to determine whether or not the controller tilts relative to the gravity direction and to also determine a degree of the tilt, based on the acceleration having been detected. Specifically, when a state where 1G (gravitational acceleration) is applied to a detection axis of the acceleration sensor in the vertically downward direction represents a reference, it is possible to determine whether or not the controller tilts relative to the vertically downward direction, based on only whether or not 1 G is applied in the direction of the detection axis of the acceleration sensor. Further, it is possible to determine a degree to which the controller tilts relative to the vertically downward direction, based on a magnitude of the acceleration applied in the direction of the detection axis. Further, the acceleration sensor capable of detecting an acceleration in multiaxial directions subjects, to a processing, the acceleration signals having been detected in the respective axes so as to more specifically determine the degree to which the controller tilts relative to the gravity direction. In this case, although the processor may calculate, based on the output from the acceleration sensor 701, data representing an angle at which the controller 7 tilts, an approximate degree to which the controller 7 tilts may be inferred based on the output from the acceleration sensor 701 without calculating the data representing the angle of the tilt. Thus, when the acceleration sensor 701 is used in combination with the processor, the tilt, attitude, or position of the controller 7 can be determined. On the other hand, in a case where it is anticipated that the acceleration sensor will be in a dynamic state, an acceleration based on a movement of the acceleration sensor is detected, in addition to the gravitational acceleration component. Therefore, when the gravitational acceleration component is eliminated through a predetermined process, it is possible to determine, for example, a direction in which the controller moves. Specifically, when the controller 7 including the acceleration sensor 701 is dynamically accelerated and moved with a hand of a user, it is possible to calculate various movements and/or positions of the controller 7 by processing the acceleration signals generated by the acceleration sensor 701. Even when it is anticipated that the acceleration sensor will be in the dynamic state, the acceleration based on the movement of the acceleration sensor is eliminated through a predetermined process, whereby it is possible to determine the tilt of the controller relative to the gravity direction. In another embodiment, the acceleration sensor 701 may include an embedded signal processor or another type of dedicated processor for performing any desired processing of the acceleration signals outputted by an embedded acceleration detection means prior to outputting signals to the microcomputer 751. For example, when the acceleration sensor is intended to detect static acceleration (for example, gravitational acceleration), the embedded or dedicated processor could convert the detected acceleration signal to a corresponding tilt angle (or another preferable parameter).

In another exemplary embodiment, a gyro-sensor incorporating, for example, a rotating or vibrating element may be used for a movement sensor for detecting for a movement of the controller 7. Exemplary MEMS gyro-sensors that may be used in this embodiment are available from Analog Devices, Inc. Unlike the acceleration sensor 701, a gyro-sensor is capable of directly detecting rotation (or angular rate) around at least one axis defined by the gyroscopic element therein. Thus, due to the fundamental differences between a gyro-sensor and an acceleration sensor, corresponding changes need to be made to the processing operations that are performed on the output signals from these devices depending on which device is selected for a particular application.

More specifically, when the tilt or attitude is calculated using a gyro-sensor instead of the acceleration sensor, significant changes are necessary. Specifically, when using a gyro-sensor, the value of the tilt is initialized at the start of the detection. Then, data on the angular rate which is output from the gyro-sensor is integrated. Next, a change amount in tilt from the value of the tilt initialized is calculated. In this case, the calculated tilt corresponds to a value represented by an angle. In contrast, when the acceleration sensor calculates the tilt, the tilt is calculated by comparing the value of the gravitational acceleration of each axial component with a predetermined reference, and therefore the calculated tilt can be represented as a vector, and an absolute direction can be determined with an acceleration detection means without initialization. The type of the value calculated as the tilt is also very different between a gyro sensor and an acceleration sensor; i.e., the value is an angle when a gyro sensor is used and is a vector when an acceleration sensor is used. Therefore, when a gyro sensor is used instead of an acceleration sensor or vice versa, data on tilt also needs to be processed through a predetermined conversion taking into account the fundamental differences between these two devices. Due to the fact that the nature of the gyro sensor is known to one skilled in the art, as well as the fundamental differences between the acceleration detection means and the gyro sensor, further details are not provided herein. While a gyro-sensor is advantageous in that a rotation can be directly detected, an acceleration sensor is generally more cost effective when used in connection with the controller described herein.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the process. Further, the microcomputer 751 controls operations of the sound IC 707 and the vibrator 704 based on data having been received from the game apparatus body 3 by the wireless module 753 via the antenna 754. The sound IC 707 processes sound data transmitted from the game apparatus body 3 via the communication section 75, and the like. The microcomputer 751 actuates the vibrator 704 in accordance with, for example, vibration data (for example, a signal for powering the vibrator 704 ON or OFF) transmitted from the game apparatus body 3 through the communication section 75.

Data from the controller 7 including an operation signal (key data) from the operation section 72, acceleration signals (x, y, and z-axis direction acceleration data: hereinafter, simply referred to as acceleration data) from the acceleration sensor 701, and the process result data from the imaging information calculation section 74 are outputted to the microcomputer 751. The microcomputer 751 temporarily stores the input data (key data, acceleration data, and process result data) in the memory 752 as the transmission data which is to be transmitted to the communication unit 6. The wireless transmission from the communication section 75 to the communication unit 6 is performed at regular time intervals, and game process is generally performed at a cycle of 1/60 sec., and therefore the wireless transmission needs to be performed at a cycle of a shorter time period. Specifically, the game process unit is 16.7 ms (1/60 sec.), and the transmission interval of the communication section 75 structured using the Bluetooth (registered trademark) is, for example, 5 ms. At a timing of the transmission to the communication unit 6, the microcomputer 751 outputs the transmission data stored in the memory 752 as a series of operation information to the wireless module 753. The wireless module 753 uses, for example, the Bluetooth (registered trademark) technology to modulate the operation information onto a carrier wave of a predetermined frequency, and radiates the radio wave signal from the antenna 754. Thus, data from the controller 7 including the key data from the operation section 72, the acceleration data from the acceleration sensor 701, and the process result data from the imaging information calculation section 74 are modulated onto the radio wave signal by the wireless module 753 and transmitted from the controller 7. The communication unit 6 of the game apparatus body 3 receives the radio wave signal, and the game apparatus body 3 demodulates or decodes the radio wave signal to obtain the series of operation information (the key data, the acceleration data, and the process result data). Based on the obtained operation information and the game program, the CPU 10 of the game apparatus body 3 performs the game process. In the case where the communication section 75 is structured using the Bluetooth (registered trademark) technology, the communication section 75 can have a function of receiving transmission data which is wirelessly transmitted from another device.

Next, with reference to FIG. 8 to FIG. 16, an outline of the game process performed for the present embodiment will be described. FIGS. 8 to 16 each shows an exemplary game screen used for the present embodiment. A game used for the present embodiment is an action adventure game. In this game, a player controls a player character in a three-dimensional virtual space, and plays the game in accordance with a predetermined story/scenario which has been previously set by a game developer. Further, multiple "puzzles (tricks)" are set at some locations in the virtual space. A player solves the multiple "puzzles" so as to continue the game.

Figure 8:
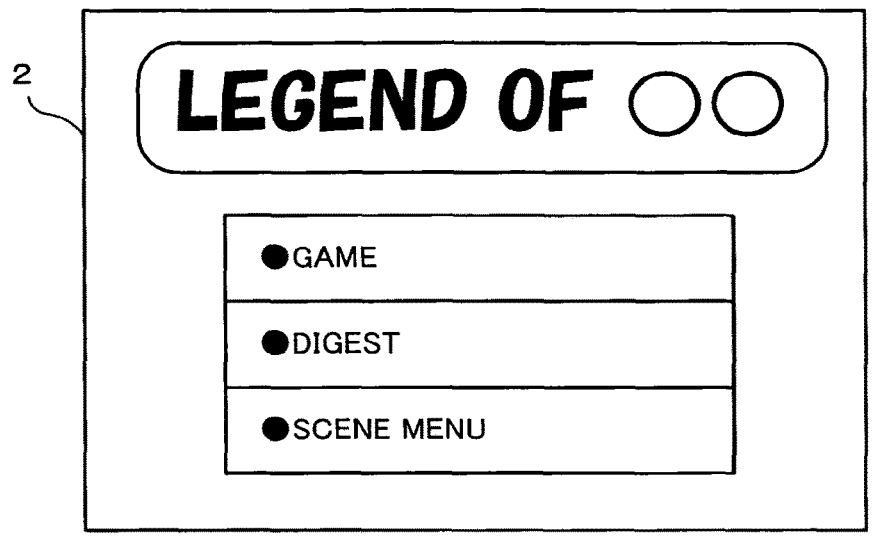
FIG. 8 shows an exemplary game screen used for the present embodiment.

FIG. 8 is a diagram illustrating a title menu of this game. As the title menu shown in FIG. 8, three options, "game", "digest", and "scene menu" are displayed. The "game" is an option for playing the game in a normal manner. The "digest" is an option for presenting a digest of a main content (storyline, flow of scenario) of the game from the beginning through the end. Further, this game is divided, in advance, into "scenes" based on the flow of the scenario. The "scene menu" is an option for allowing selection of a predetermined "scene" so as to start the game play from the selected scene. A player is allowed to select a desired one from the three options.

Figure 9:
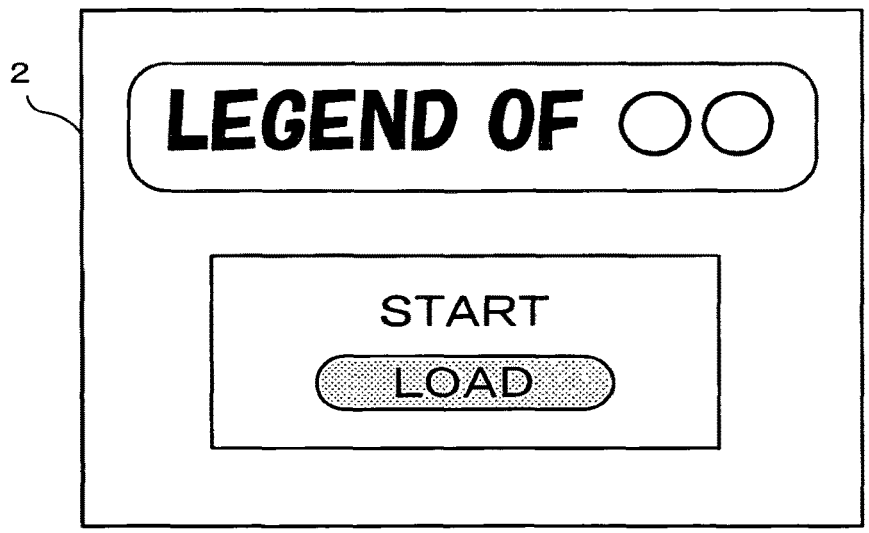
FIG. 9 shows an exemplary game screen used for the present embodiment.

An outline of a process performed when the "game" is selected from the title menu will be described. When a player selects the "game" from the title menu, a start menu as shown in FIG. 9 is displayed. Two options, "start" and "load", are displayed in this menu. When a player selects "start", the game is played from the beginning. On the other hand, when a player selects "load", user saved-data described below is read so as to play the game from a location immediately following a location at which the game has been previously stopped.

Figure 10:
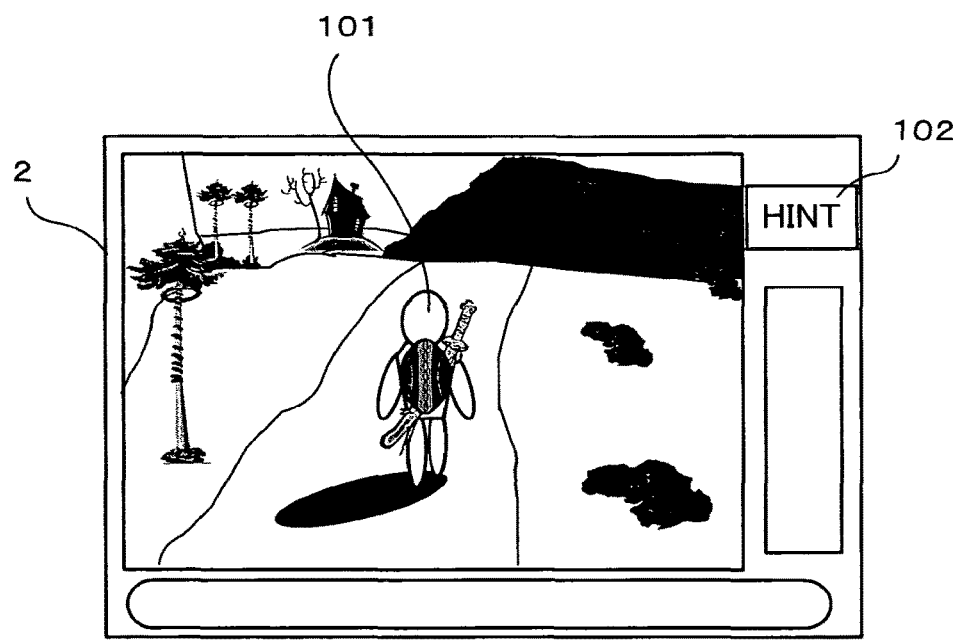
FIG. 10 shows an exemplary game screen used for the present embodiment.

FIG. 10 shows an exemplary game screen displayed when the game is started by selecting one of "start" or "load". In FIG. 10, a three-dimensional virtual game space is displayed on the television 2, and a player character 101 is also displayed therein. Further, a hint button 102 is displayed on the upper right portion of the screen. A player controls a player character 101 on the screen by using the controller 7 so as to play the game.

Figure 11:
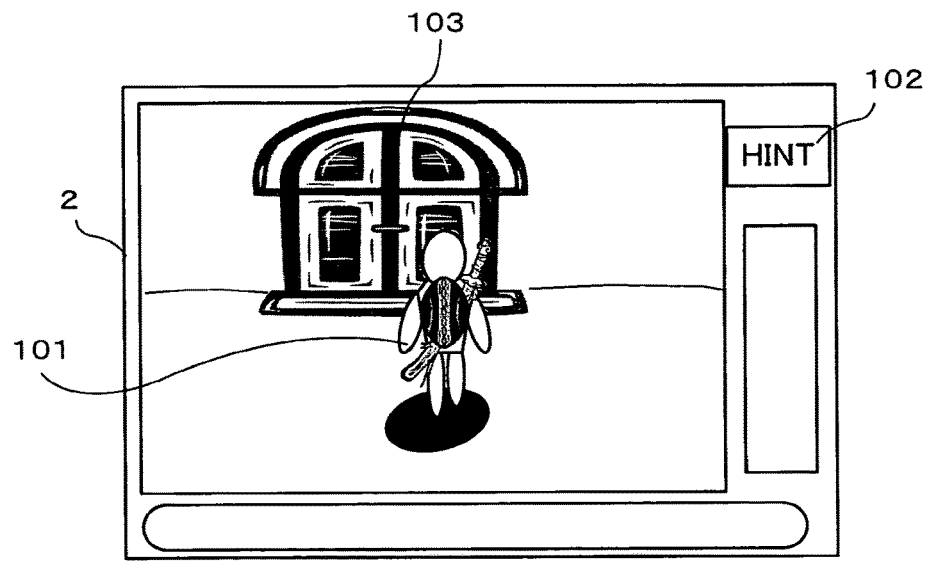
FIG. 11 shows an exemplary game screen used for the present embodiment.

While a player is playing the game, the player encounters the "puzzle" set in the game as described above. FIG. 11 shows an exemplary scene in which the "puzzle" is set. In FIG. 11, how to open a door 103 is set as the "puzzle" Specifically, the player needs to solve the "puzzle" in some manner so as to open the door 103 and continue the game. Here, in order to respond to the "puzzle", that is, in order to open the door 103, it is necessary to press a switch provided at a predetermined position on a floor.

Figure 12:
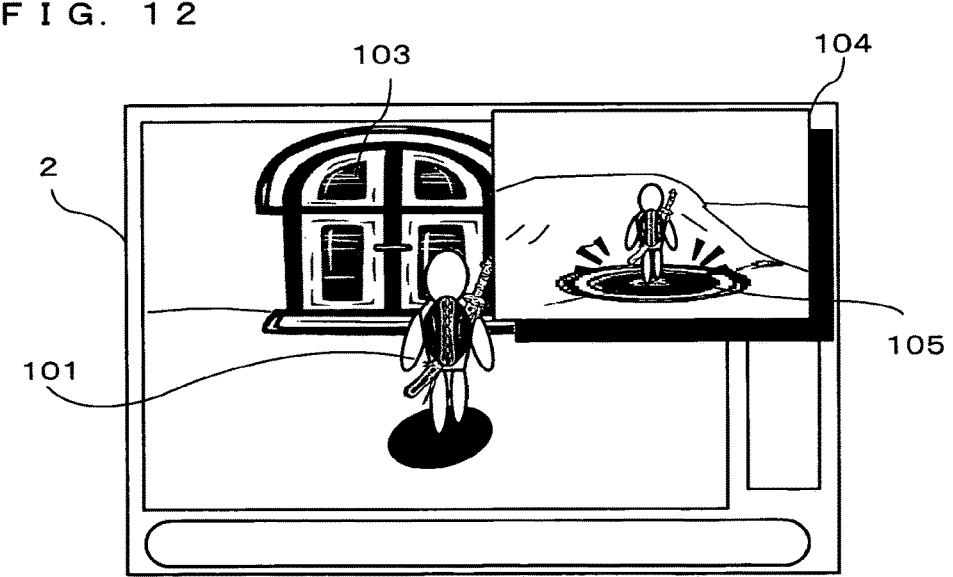
FIG. 12 shows an exemplary game screen used for the present embodiment.

In the scene shown in FIG. 11, when a player cannot find how to open the door 103, a player may press the hint button 102. In this case, as shown in FIG. 12, a relatively small window 104 is displayed in a portion of the upper right area of the screen so as to reproduce moving images (hereinafter, referred to as an approach movie) indicating how to open the door 103. In FIG. 12, an approach movie representing a state where the player character 101 moves onto a switch 105 provided on the floor for opening the door 103, and stands on the switch 105 (that is, presses the switch 105) is reproduced. By viewing the approach movie, the player can know how to open the door 103. Therefore, the player moves the player character 101 to the switch 105 provided on the floor, and causes the player character 101 to stand thereon, as indicated by the approach movie, so as to open the door 103, thereby continuing the game.

As described above, when, for example, a player cannot find how to solve the puzzle, and therefore does not continue the game, the player is allowed to press the hint button, so that the approach movie indicating, for example, how to solve the puzzle for the scene is reproduced. Thus, the player may play the game to the end without becoming stuck with the game, and the player may clear the game. Further, the approach movie indicates, as an actual example, how to solve the puzzle, or the like (that is, how to solve the puzzle is demonstrated), and therefore the player may understand how to solve the puzzle, or the like, more easily as compared to a case where a hint or the like is indicated by using character information only. Further, the player may enjoy the presented approach information as it is. Further, only when the hint button is pressed, how to solve the puzzle is indicated, and therefore a player who desires to solve the puzzle by him/herself may not reduce his/her interest in the game as compared to a case where a hint or the like for indicating how to solve the puzzle is displayed regardless of the user's intention.

Figure 13:
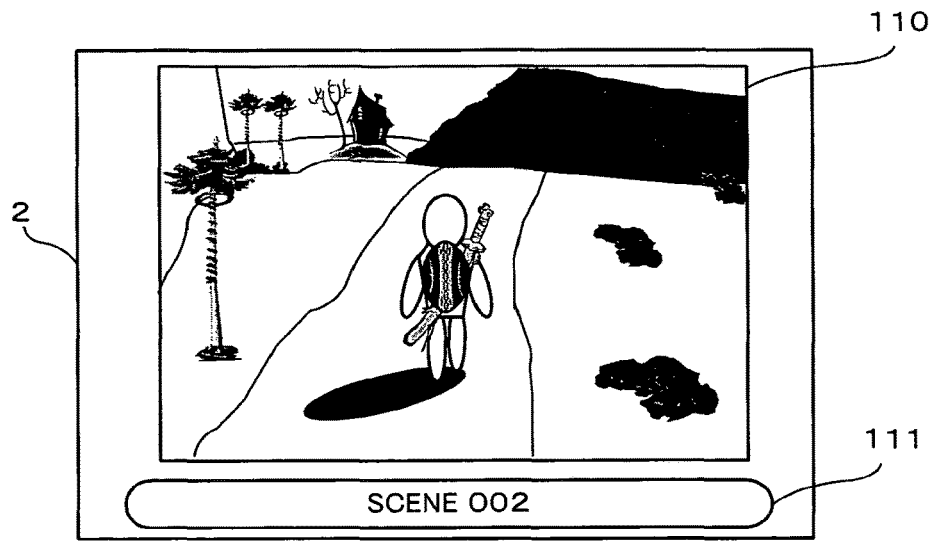
FIG. 13 shows an exemplary game screen used for the present embodiment.

Next, an outline of a process performed when the "digest" is selected from the title menu shown in FIG. 8 will be described. When the "digest" is selected, a digest movie, which has been previously set, is reproduced. FIG. 13 shows an exemplary game screen displayed when the "digest" is selected. In FIG. 13, a digest movie is displayed in a movie area 110, and a scene name 111 representing a current scene is displayed below the movie area 110. The digest movie includes, for example, a "played moving image" representing a recorded image of a game screen obtained by a game developer having actually played the game, an "event movie" which is inserted in the game as necessary, and the like. For example, the game is played in accordance with a scenario having a storyline representing the order of "forest"→"cave"→"tower"→"temple". In this case, the content of the digest movie is reproduced as a digest such that the game starts with a scene of "forest" and advances to "cave"→"tower"→"temple". A player is allowed to know a main game story and scenario, and a game plot by viewing the digest movie.

Figure 14:
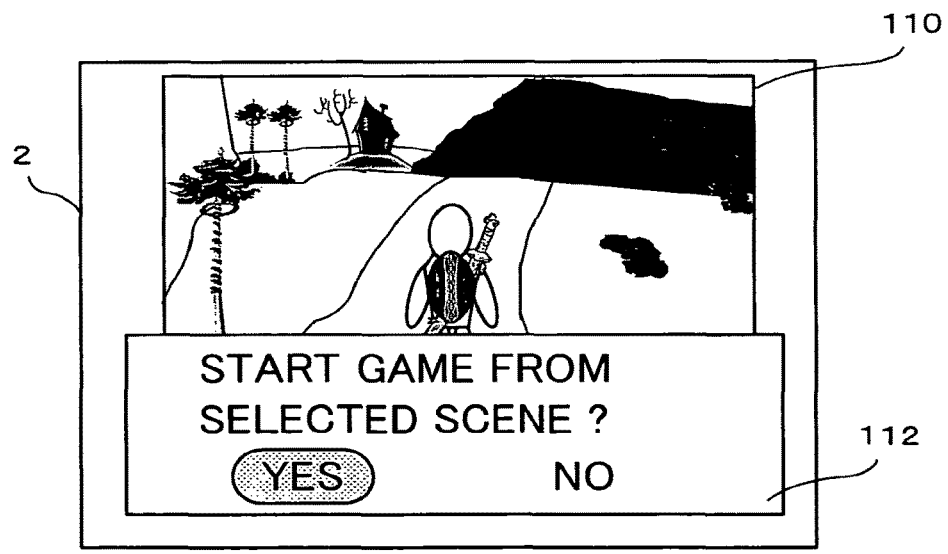
FIG. 14 shows an exemplary game screen used for the present embodiment.

Further, in a case where a player presses a predetermined button, for example, the operation button 72d while the digest movie is being reproduced, the player is allowed to play the game from the scene being reproduced at this time. For example, it is assumed that, when fifteen minutes has passed from the start of the reproduction of the digest movie, a played moving image for "temple" corresponding to one of stages of the game is being reproduced. At this time, when a player presses the operation button 72d, an inquiry message 112 for inquiring whether or not the game is to be played from this scene is displayed as shown in FIG. 14. When a player responds positively to the message, the saved data (hereinafter, referred to as digest saved-data) for digest, which has been previously set, is read. As described below, the digest saved-data are saved data which is previously set so as to correspond to the scenes, respectively, in the game. In a case shown in FIG. 14, based on the assumption that the game has been played up to the moment immediately before the temple, the saved data having been previously set is read. Therefore, a level and various statuses (parameter such as HP) of the player character are advanced to some degree as compared to those provided when the game is started. Further, items which may belong to the player character when the game has been normally played and advanced to the temple are set as items belonging to the player character. Specifically, saved data to be used when attacking against the temple is ready to read. It is possible to start the game from the scene of "temple" by reading the digest saved-data described above. However, in this game, data of the game which is started in this manner is not saved. That is, only the data of the game obtained by a user performing attacking by him/herself are stored, so that a user who performs attacking by him/herself may not reduce his/her interest in the game. Hereinafter, a game play in which the game is started, while the digest movie is being reproduced, in a state where no data of the game is saved, is referred to as a game played in a "digest mode". However, data may be saved in the digest mode when it is unnecessary to consider that the interest in the game is maintained.

A difference between the user saved-data and the digest saved-data will be described. The user saved-data can be "loaded" when the "game" is selected from the title menu, and the user saved-data is generated and stored when a player issues an instruction for the saving while playing the game. On the other hand, the digest saved-data is different from the user saved-data in that the digest saved-data is previously set based on the game storyline as described above, and is stored as a part of the game program in the optical disc 4. As described above, the saving is not allowed in the digest mode, whereas the user saved-data to be stored is obtained only when a user plays the game from the beginning, and performs attacking by him/herself.

As described above, a player is allowed to know the outline of the game content by viewing the digest movie. Further, when a player desires to play the game from a certain scene of the digest movie being reproduced, the player is allowed to start the game from the scene. Therefore, a player can not only know the entire outline of the game content but also play the game from a scene desired by the player, so that the player can more easily enjoy the game. As described above, saving is not allowed in the "digest mode" during the game play, and therefore it is possible to prevent a player who desires to clear the game by him/herself, or a player who desires to thoroughly play the game from reducing his/her interest in the game. That is, a player who desires to easily play the game or a player who dose not have a lot of time for the game is allowed to easily enjoy the game by selecting the "digest" (or "scene menu" described below). On the other hand, a player who desires to enjoy the game as much as possible is allowed to thoroughly enjoy, by selecting the "game", the game including, for example, a trick event, and a sub-story (elements other than the main game story) which are not provided in the "digest". Further, data of the game obtained by his/her own attacking can be stored as saved data.

Figure 15:
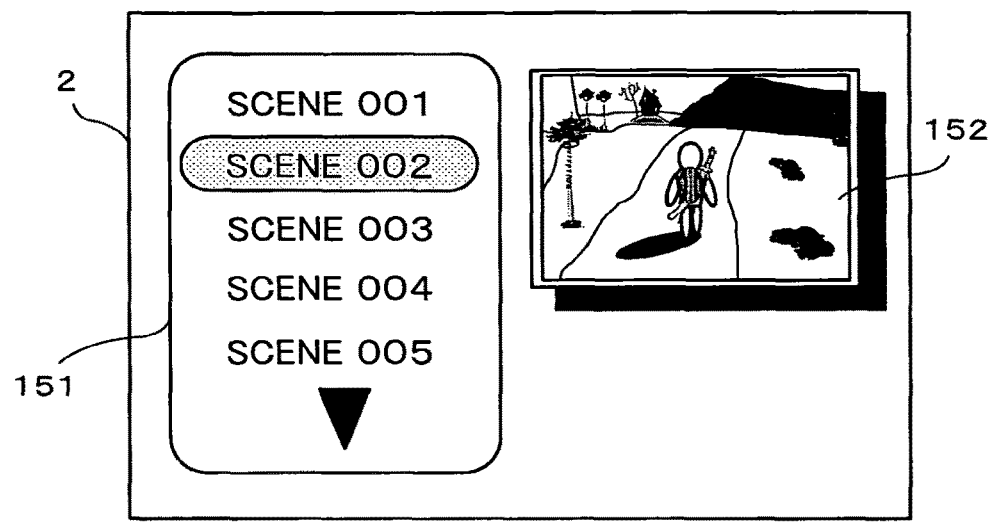
FIG. 15 shows an exemplary game screen used for the present embodiment.

Next, an outline of a process performed when the "scene menu" is selected from the title menu shown in FIG. 8 will be described. FIG. 15 shows an exemplary screen displayed when the "scene menu" is selected. In FIG. 15, a list 151 indicating scene names is displayed on almost a left half of the screen (the list 151 can be scrolled because all the scene names cannot be simultaneously displayed). As described above, the "scene" is obtained by dividing the scenario of this game. For example, the scenario of this game includes a scene of "cave", and the "cave" includes a first aboveground level, a first underground level, and a second underground level. In this case, the game may be divided into "scene 1" representing a scene in which the first aboveground level is attacked and the first underground level is just reached, "scene 2" representing a scene in which the first underground level is attacked, and the second underground level is just reached, "scene 3" representing a scene in which the second underground level is attacked and a location immediately preceding a deepest portion, of the cave, occupied by a boss character is just reached, and "scene 4" representing a scene of a fight against the boss character.

Further, the digest saved-data correspond to the scenes, respectively. Furthermore, the corresponding digest saved-data is reproduced from the opening portion of each scene. In the example of the cave, the digest saved-data corresponding to "scene 1" is saved data which is reproduced from the entrance to the cave. Further, the digest saved-data corresponding to "scene 2" is saved data which is reproduced from the arrival at the first underground level of the cave. The digest saved-data corresponding to "scene 3" is saved data which is reproduced from the arrival at the second underground level of the cave, and the digest saved-data corresponding to "scene 4" is saved data which is reproduced from a location immediately preceding a location occupied by the boss character. A player is allowed to start the game from the opening portion of a desired scene in the game by loading the digest saved-data.

Figure 16:
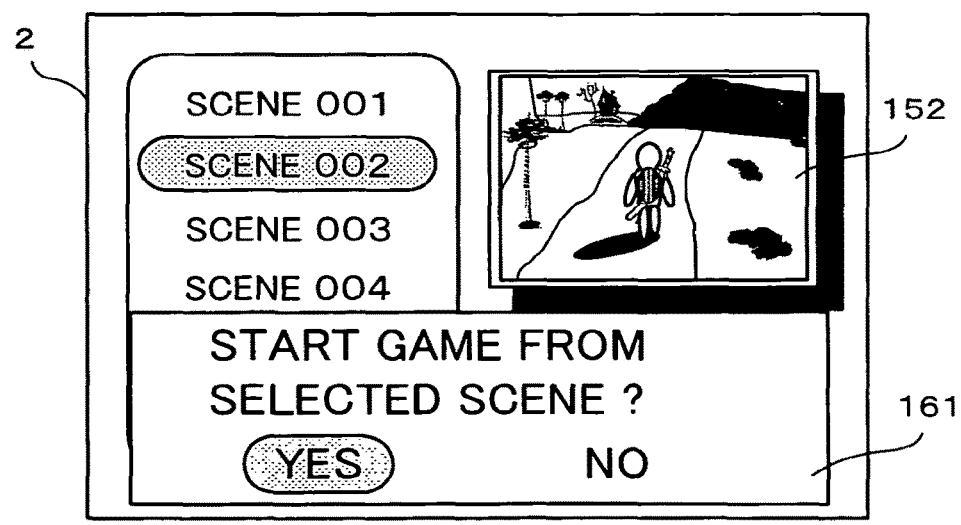
FIG. 16 shows an exemplary game screen used for the present embodiment.

In FIG. 15, when a desired scene name is designated by a cursor, a moving image 152 representing a content of the scene is reproduced to the right of the scene names. The content of the moving image 152 represents a part of the scene designated by the cursor. When a player selects a desired scene and inputs (for example, presses the operation button 72d) an instruction for the game start, an inquiry message 161, as shown in FIG. 16, inquiring whether or not the game is to be played from the selected scene is displayed. When the player responds positively to the message, the digest saved-data corresponding to the selected scene is loaded, and the game can be started in the digest mode from the opening portion of the scene. As described above, the digest saved-data is set based on an assumption that the game has been played up to the scene, and the level of and the items belonging to the player character are set based on each scene. Therefore, a player can play the game without feeling unnatural and becoming stuck with the game as compared to a case where a game is played by using a player character in an initial state (a state immediately after the game is started).

Figure 17:
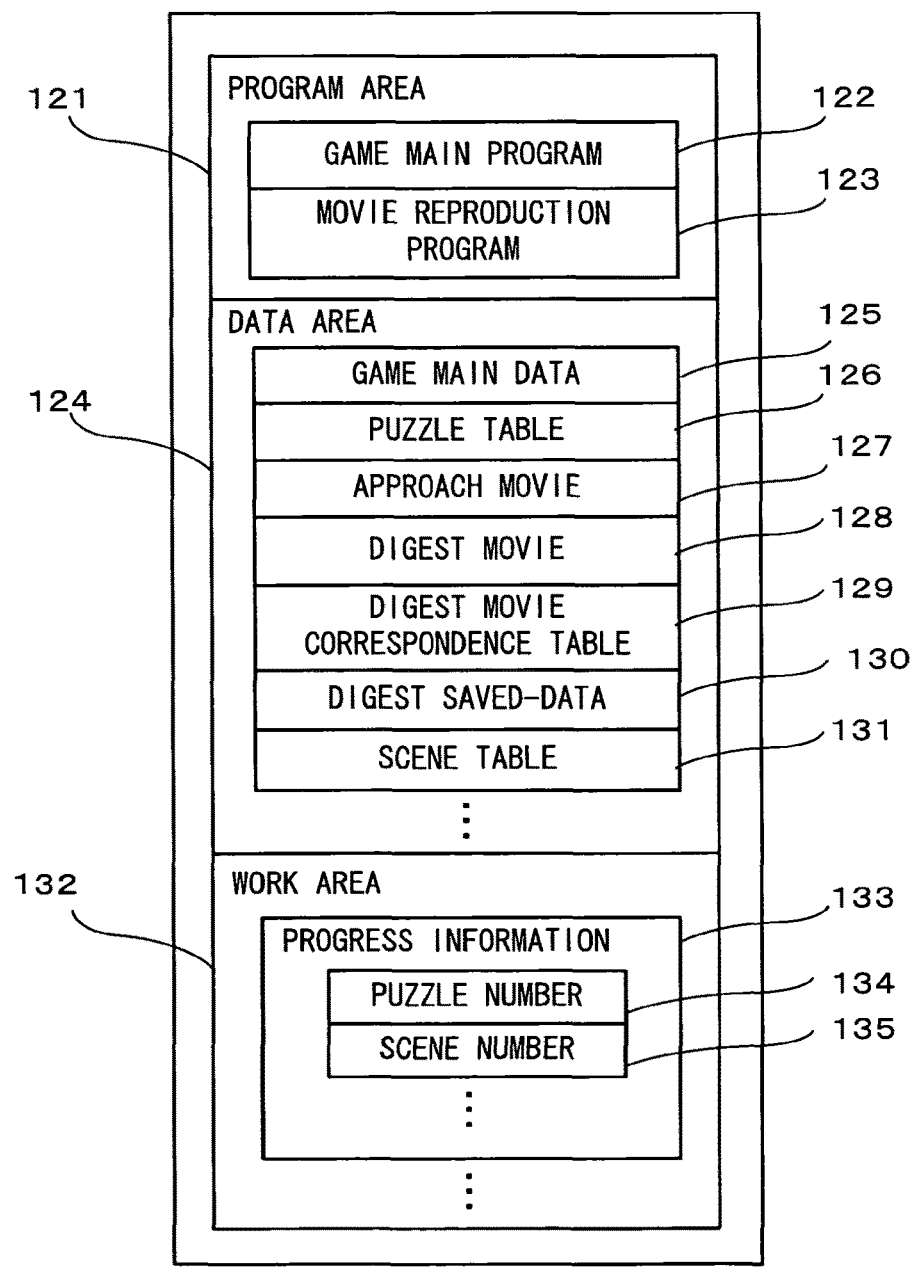
FIG. 17 is a diagram illustrating a memory map of an external main memory 12 of the game apparatus body 3.

Next, a game process performed by the game apparatus body 3 will be described in detail. Firstly, data to be stored in the external main memory 12 for the game process will be described. FIG. 17 is a diagram illustrating a memory map of the external main memory 12 of the game apparatus body 3. In FIG. 17, the external main memory 12 includes a program area 121, a data area 124, and a work area 132. Data of the program area 121 and the data area 124 are stored in the optical disc 4, and is transmitted to and stored in the external main memory 12 when the game program is executed. For the convenience of the description, each data is described as a form of table data. However, the data need not to be stored in a form of table data in practice, and a process of contents represented by the table may be stored.

The program area 121 stores a game program to be executed by the CPU 10, and the game program includes a game main program 122, a movie reproduction program 123, and the like. The game main program 122 is a program for a process of a flow chart which is shown below in FIG. 25. The movie reproduction program 123 is a program for decoding and reproducing data representing, for example, a moving image and a sound having been compressed and encoded. The movie reproduction program 123 is used for reproducing a moving image file such as the approach movie and the digest movie described above.

The data area 124 stores data such as game main data 125, a puzzle table 126, an approach movie 127, a digest movie 128, a digest movie correspondence table 129, digest saved-data 130, and a scene table 131.

The game main data 125 represents data necessary for the game process performed when the "game" is selected from the title menu shown in FIG. 8. For example, the game main data 125 includes data (position data, various parameters, and the like) associated with the player character 101, an opponent character, and the like, appearing in the game, data (topography data and the like) associated with a virtual game space, image data, audio data, and the like.

The puzzle table 126 is data representing correspondences among locations at which the "puzzles" are set in the game, contents of the "puzzles", and the approach movies which represent the "puzzles" and indicate how to solve the "puzzles", respectively. FIG. 18 is a diagram illustrating an exemplary data structure of the puzzle table 126. The puzzle table 126 includes a location 1261, a puzzle number 1265, a puzzle content 1266, an approach movie name 1267, and a scene number 1268.

The location 1261 represents data indicating a location (area), in the virtual game space, at which a puzzle is set. The location 1261 further includes an area name 1262, a base point name 1263, and a specific location name 1264. In the example shown in FIG. 18, a puzzle 1 is set at a house of a village head (the specific location name 1264) of ∘∘ village (the base point name 1263) in ∘∘ area (the area name 1262). The puzzle number 1265 is a number for identifying each "puzzle", and the puzzle content 1266 is data representing a specific content of each "puzzle". For example, the content, such as a content that a predetermined switch needs to be pressed so as to open a door, and a content that a predetermined enemy needs to be eliminated so as to transfer to another world, are defined in the puzzle content 1266. The approach movie name 1267 represents a name of the approach movie corresponding to each "puzzle" The scene number 1268 is a number for identifying a scene in which each "puzzle" is set. The scene number 1268 corresponds to a scene number 1311 of the scene table 131 described below.

Returning to FIG. 17, the approach movie 127 represents the approach movie described above. FIG. 19 is a diagram illustrating an exemplary data structure of the approach movie 127. An approach movie name 1271 represents a name for identifying each approach movie, and corresponds to the approach movie name 1267 of the puzzle table 126. A movie content 1272 represents a specific movie content. For example, the movie content 1272 represents video/audio data which are compressed and encoded based on a predetermined standard such as MPEG-2.

Figure 20:
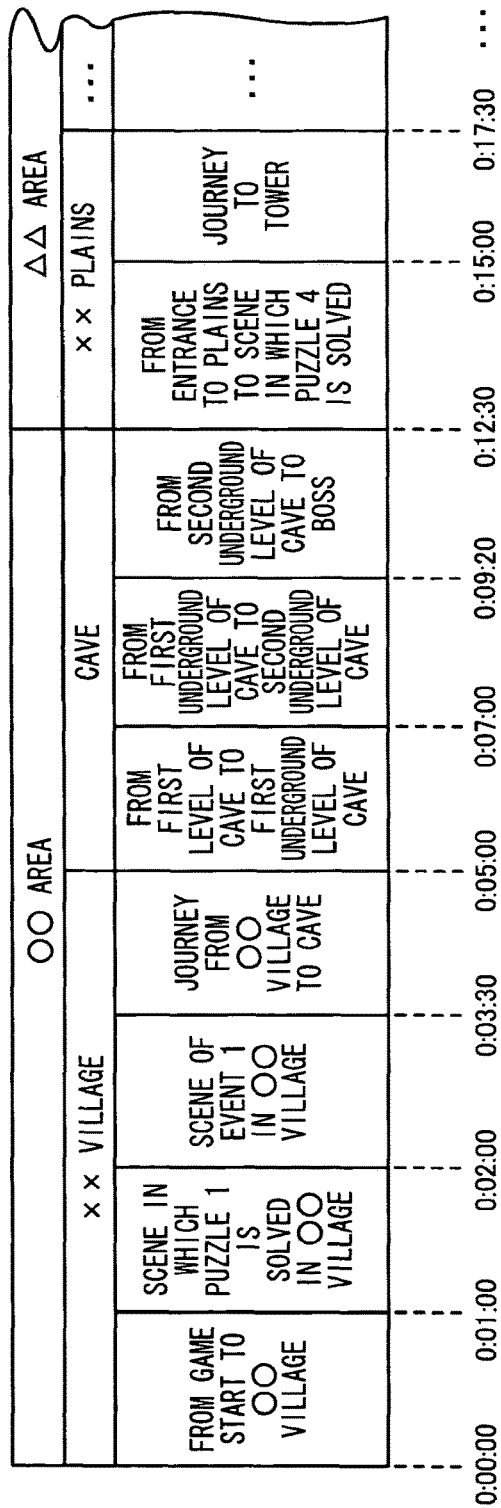
FIG. 20 is a diagram conceptually illustrating an exemplary structure of a digest movie in chronological order.

Returning to FIG. 17, the digest movie 128 is a movie reproduced when the "digest" is selected from the title menu shown in FIG. 8. FIG. 20 is a diagram conceptually illustrating an exemplary structure of the digest movie. The time shown in FIG. 20 is represented by "hour:minute:second". The digest movie shown in FIG. 20 indicates that a video into which a course from the start of the game to arrival at ∘∘ village is digested is reproduced from the start of the reproduction to 0:01:00. Further, it is indicated that a video representing a state where puzzle 1 is solved in ∘∘ village is reproduced from 0:01:00 to 0:02:00. A video (event movie) representing an event which happens in oo village is reproduced from 0:02:00 to 0:03:30. The order in which the scenes of the game are reproduced is based on a flow of the story/scenario which is previously set by a developer.

Returning to FIG. 17, the digest movie correspondence table 129 is a table for defining correspondence between a portion, of a video of the digest movie, to be reproduced, and the digest saved-data 130 described below. Specifically, the digest movie correspondence table 129 is a table in which the digest saved-data 130 to be read in response to the instruction for start being issued during reproduction of the digest movie are defined so as to correspond to the scenes, respectively, of the digest movie. FIG. 21 is a diagram illustrating an exemplary data structure of the digest movie correspondence table 129. The digest movie correspondence table 129 includes a reproduction from-time 1291 and a reproduction to-time 1292, and a digest saved-data name 1293.

The reproduction from-time 1291 and the reproduction to-time 1292 are data indicating a time range representing an elapsed time from the start of the reproduction of the digest movie. For example, when the reproduction from-time 1291 represents "0:01:00" and the reproduction to-time 1292 represents "0:02:00", the time range is a range from a time at which one minute has passed from the start of the reproduction of the digest movie to a time immediately preceding a time at which two minutes passes from the start of the reproduction of the digest movie. The digest saved-data name 1293 represents data used for designating the digest saved-data to be read when an instruction for game play is issued in a time range from the reproduction from-time 1291 to the reproduction to-time 1292. Although in the present embodiment the range of the digest movie is defined by using the elapsed time from the start of the reproduction, the present invention is not limited thereto. The range may be defined by using a frame number of the reproduced moving image.

Returning to FIG. 17, the digest saved-data 130 represents saved data which is previously set in accordance with the flow of the game. FIG. 22 is a diagram illustrating an exemplary data structure of the digest saved-data 130. The digest saved-data name 1301 is a name for uniquely identifying each digest saved-data, and corresponds to the digest saved-data name 1293 of the digest movie correspondence table 129. The data content 1302 represent a specific content of the saved data. The data content 1302 includes data representing a level of the player character, items belonging to the player character, a current location thereof in the virtual game space, an event scene having been cleared, and the like, based on each scene.

Returning to FIG. 17, the scene table 131 represents a table for defining each scene in the game. The scene table 131 represents data mainly used in the "scene menu" screen as shown in FIG. 15. FIG. 23 is a diagram illustrating an exemplary data structure of the scene table 131. The scene table 131 is a collection of a scene number 1311, a start point 1312, an end point 1313, digest saved-data name 1314, and an introduction movie 1315. The scene number 1311 is a number for identifying each scene. The start point 1312 and the end point 1313 represent data indicating a range of each scene in the game (scenario). In the example shown in FIG. 23, a scene from the start of the game to clearing of puzzle 1 is defined as one scene (corresponding to scene number "001"). The digest saved-data name 1314 corresponds to the digest saved-data name 1301 of the digest saved-data 130. The introduction movie 1315 represents movie data (corresponding to a moving image 152 shown in FIG. 15) for introducing a content of each scene. The opening portion of each scene is stored as the movie data.

Returning to FIG. 17, the work area 132 is an area for storing various data, flags and the like, which are temporarily used in the game process. Specifically, progress information 133 and the like are stored in the work area 132. The progress information 133 represents data associated with the progress state of the game being currently played by a player, and includes a puzzle number 134, a scene number 135, and the like. The puzzle number 134 represents data indicating whether or not a "puzzle" as described above is set at a location, in the virtual space, at which the player character is currently positioned, and in a scene, in the game, in which the player character currently appears, and indicating, when the "puzzle" is set, the location corresponding to the "puzzle" The puzzle number 134 corresponds to the puzzle number 1265 of the puzzle table 126. Further, when the hint button 102 is pressed, the data is referred to so as to retrieve the approach movie corresponding to the "puzzle" The scene number 135 represents data corresponding to the scene number 1311 of the scene table 131, and represents data indicating a scene being currently played by a player. In addition to the above data, the work area 132 stores various data, flags, and the like which are temporarily used during the game process.

Figure 24:
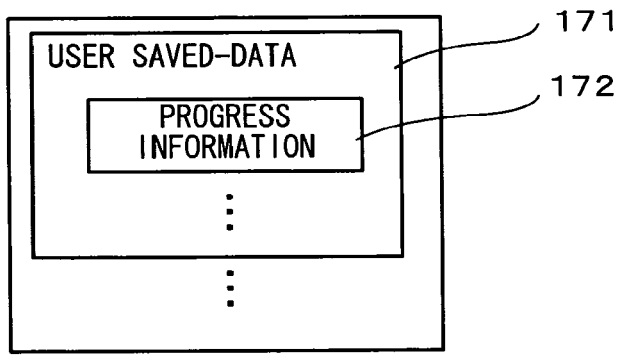
FIG. 24 is a diagram illustrating a memory map of a flash memory 17 shown in FIG. 2.

Next, data stored in the flash memory 17 will be described. FIG. 24 is a diagram illustrating a memory map of the flash memory 17 shown in FIG. 2. As described above, the flash memory 17 is a non-volatile memory, and the data described below are not eliminated but held even when the game apparatus body 3 is powered off. In FIG. 24, the flash memory 17 stores user saved-data 171 and the like. The data may be transferred to and stored in the external main memory 12 when the game program is executed.

The user saved-data 171 is data representing a progress state of a game. In the game process started by selecting the "game" from the title menu, the saved data is generated or updated by, for example, an instruction for saving being issued from a player. The progress information 172 included in the user saved-data 171 corresponds to the progress information 133, in the work area 132, stored as a part of the user saved-data 171.

Next, the game process performed by the game apparatus body 3 will be described with reference to FIGS. 25 to 29. When the game apparatus body 3 is powered on, the CPU 10 of the game apparatus body 3 executes a boot program stored in the ROM/RTC 13, so as to initialize the respective units such as the main memory 33. The game program stored in the optical disc 4 is loaded o the main memory 33, and the CPU 10 starts the execution of the game program. The flow chart shown in FIG. 25 is a flow chart showing the game process performed after the process steps described above are completed.

Figure 25:
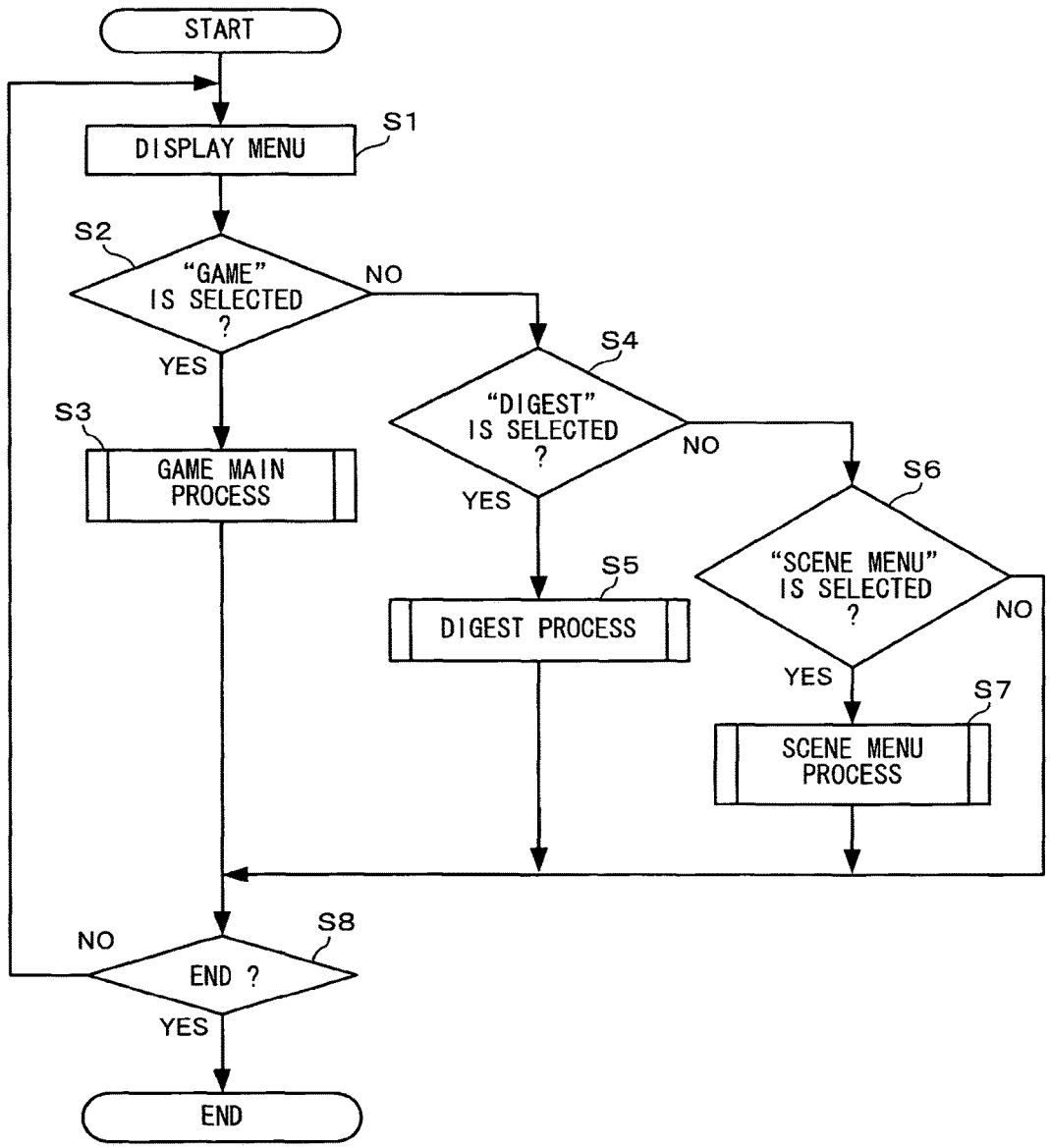
FIG. 25 is a flow chart showing game process according to the embodiment of the present invention.

In FIG. 25, when the execution of the game program is started, the title menu (refer to FIG. 8) is firstly displayed. Then, an input (selection of a menu option) from a player is received (step S1). When the input from the player is received, a selected option is then determined. Initially, whether or not the "game" is selected is determined (step S2). When a result of the determination indicates that the "game" is selected (YES in step S2), a game main process (step S3) is performed as described below.

On the other hand, when it is determined that the "game" is not selected (NO in step S2), whether or not the "digest" is selected is then determined (step S4). When a result of the determination indicates that the "digest" is selected (YES in step S4), a digest process (step S5) is performed as described below.

On the other hand, when it is determined in step S4 that the "digest" is not selected (NO in step S4), whether or not the "scene menu" is selected is then determined (step S6). When a result of the determination indicates that the "scene menu" is selected (YES in step S6), a scene menu process (step S7) is performed as describe below.

On the other hand, when it is determined that the "scene menu" is not selected (NO in step S6) or when steps S3, S5, or S7 described above is completed, whether or not the game process is to be ended is determined (step S8). When the determination represents YES, the game process according to the present embodiment is ended, and when the determination represents NO, the process is returned to step S1 and the game process is repeated.

Figure 26:
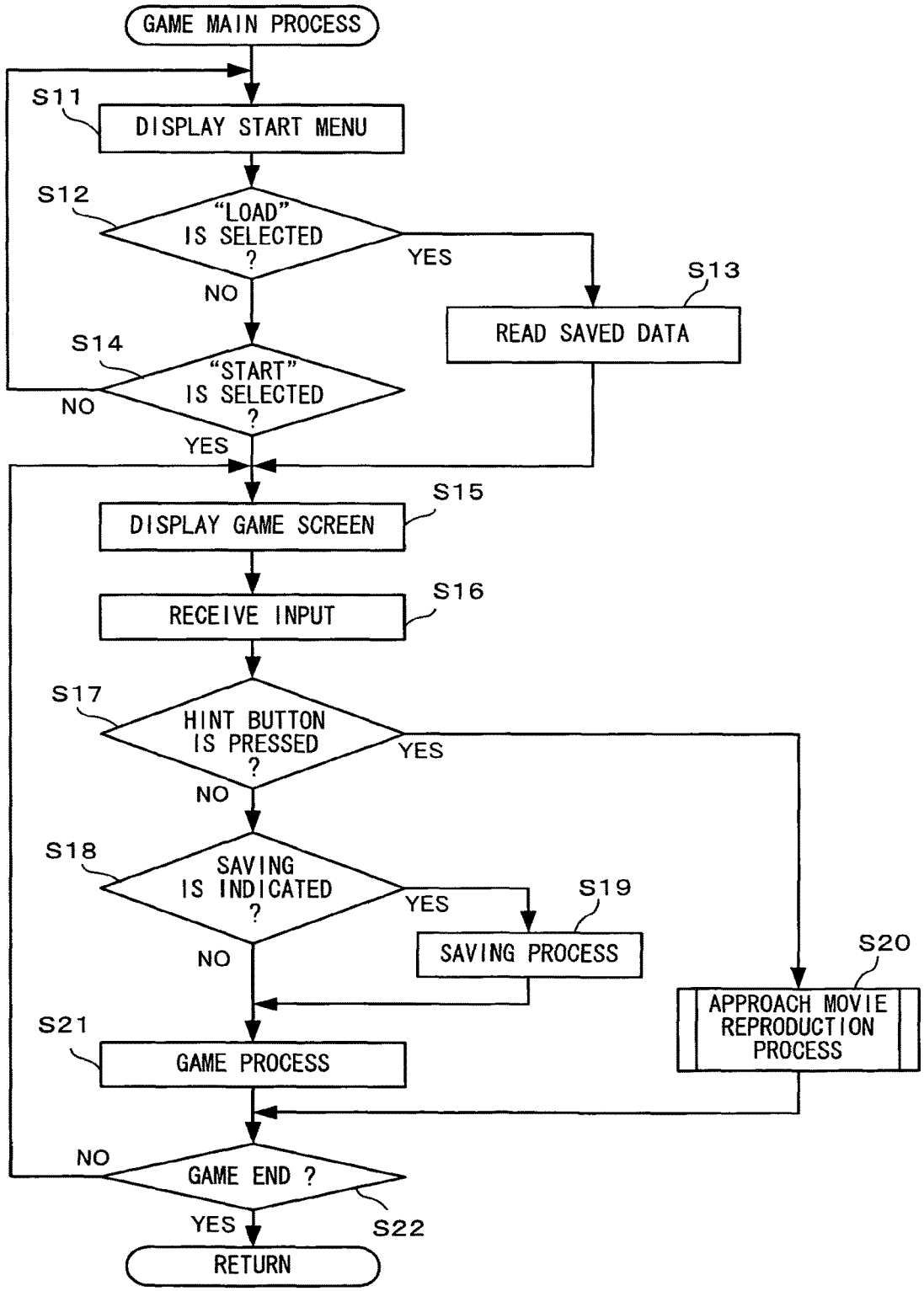
FIG. 26 is a flow chart showing in detail a game main process of step S3 shown in FIG. 25.

Next, the game main process of step S3 will be descried in detail. FIG. 26 is a flow chart showing in detail the game main process of step S3. As shown in FIG. 26, the start menu as shown in FIG. 9 is displayed, and an input from a player is received (step S11).

Next, whether or not a player selects the "load" from the start menu is determined (step S12). When a result of the determination indicates that the player selects the "load" (YES in step S12), predetermined user saved-data is read in accordance with a player's operation (step S13). Thereafter, the game is started, and a game screen is displayed (step S15).

On the other hand, when it is determined in step S12 that the player does not select the "load" (NO in step S12), whether or not the player selects the "start" from the start menu is then determined (step S14). A result of the determination indicates that the player selects the "start" (YES in step S14), a process step of step S15 is performed without reading user saved-data. Specifically, the game is started from an initial state having been previously set, and the game screen is displayed. As a result, a game screen including the hint button 102 as shown in FIG. 10 is displayed. On the other hand, when it is determined that the player does not select the "start" (NO in step S14), the process is returned to step S11, and the process is repeated.

When the game is started, reception of an input (operation) from a player is started (step S16). When an input from a player is made, whether or not the content of the input represents an operation of pressing the hint button 102 is determined (step S17). When a result of the determination indicates that the content of the input represents the operation of pressing the hint button 102 (YES in step S17), an approach movie reproduction process is performed as described below (step S20). On the other hand, when it is determined that the hint button 102 is not pressed (NO in step S17), whether or not the content of the input from a player represents an operation for saving a game is then determined (step S18). When a result of the determination indicates that the content of the input from the player represents the operation for saving the game (Yes in step S18), a saving process is performed (step S19). In the saving process, a process for generating or updating the user saved-data 171 is performed based on the progress information 133 and the like. On the other hand, when it is determined in step S18 that the content of the input from the player does not represent the operation for saving the game (NO in step S18), another game process is performed based on the content of the input from the player (step S21). In this process, a game process other than the approach movie reproduction process is performed, for example, various processes for the general game process, such as a process for moving the player character 101 or a process for causing the player character 101 to perform attacking, based on the input from the player, are performed. At this time, the scene number 135 of the progress information 133 is updated as necessary so as to indicate a scene being currently played by a player. Further, when the player character 101 moves to a scene, in the virtual game space, in which the "puzzle" is set (whether or not the player character 101 has moved is determined based on the location 1261 and the scene number 1268), the puzzle number 1265 corresponding to the puzzle is read from the puzzle table 126, and copied and set to the puzzle number 134 of the progress information 133. Further, when the player character 101 leaves the scene in which the "puzzle" is set, a NULL value is set to the puzzle number 134. Thus, whether or not a player is currently trying to solve the "puzzle" is determined based on whether or not "NULL" is set to the puzzle number 134 of the progress information 133. The other various game processes (processes for movement, fighting, conversation, and the like) are not directly relevant to the present invention, and the description thereof is not given.

Figure 27:
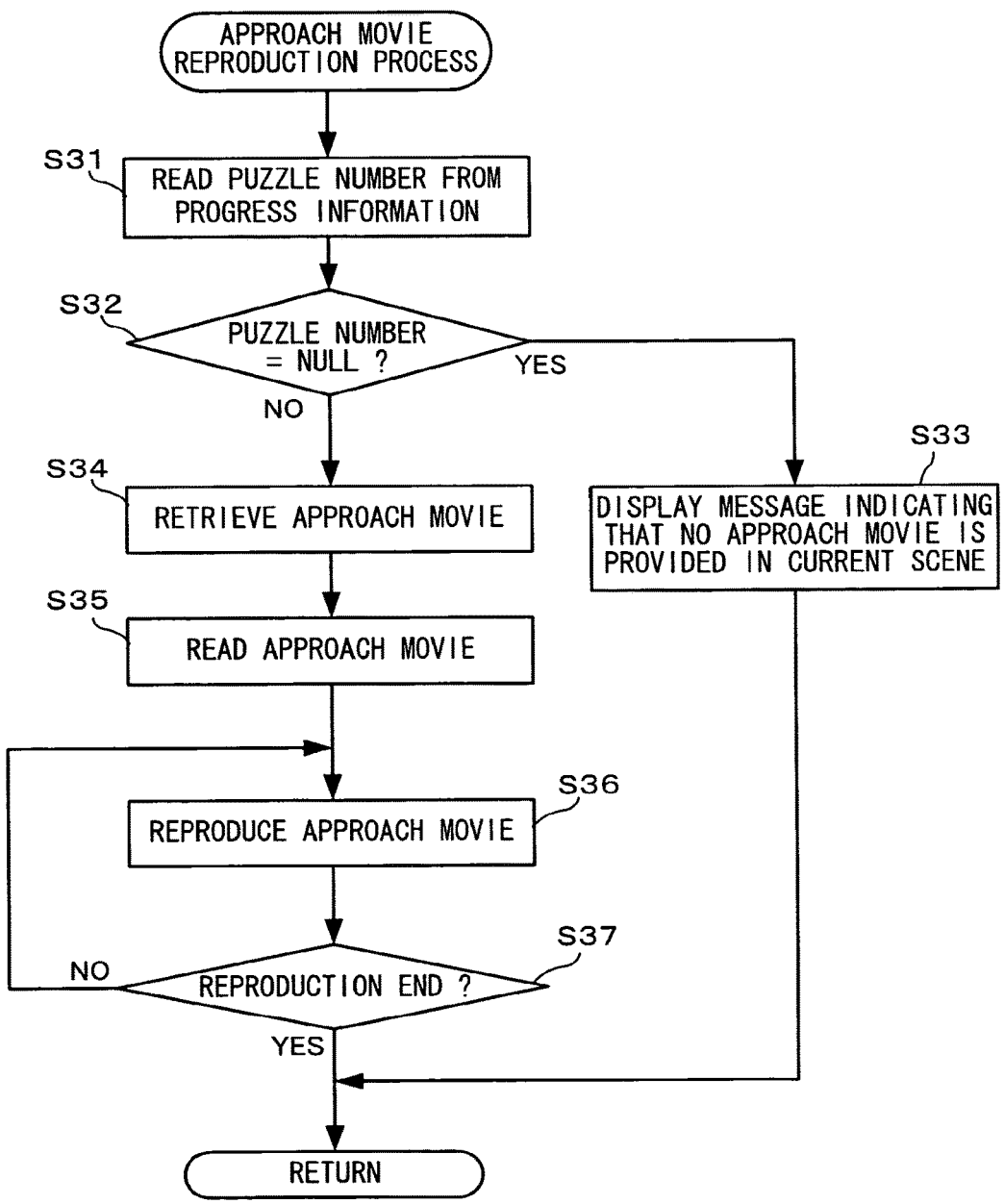
FIG. 27 is a flow chart showing in detail an approach movie reproduction process of step S18 shown in FIG. 26.

Next, the approach movie reproduction process of step S18 will be described in detail with reference to a flow chart shown in FIG. 27. In FIG. 27, firstly, whether or not a scene in which the "puzzle" is set is displayed to a player is determined. Specifically, the puzzle number 134 is read from the progress information 133 of the work area 132 (step S31). Whether or not the puzzle number 134 indicates "NULL" is determined (step S32). When the result of the determination indicates that the puzzle number 134 indicates "NULL" (YES in step S32), that is, when the player character is not in the scene in which the "puzzle" is set, a process for indicating that no hint is provided is performed (step S33), and the approach movie process is ended. In another embodiment, the puzzle number is determined for each frame, and when the puzzle number 134 indicates "NULL", the hint button 102 may not be displayed.

On the other hand, when it is determined in step S32 that the puzzle number 134 does not indicate "NULL" (NO in step S32), a player character may be in a scene in which a "puzzle" is set. Therefore, a process for retrieving the approach movie name 1267 from the puzzle table 126 based on a value set to the puzzle number 134 is performed (step S34). Specifically, firstly, the puzzle table 126 is accessed so as to retrieve the puzzle number 1265 corresponding to the value of the puzzle number 134 of the progress information 133. The approach movie name 1267 of the puzzle number 1265 having been retrieved is acquired.

Next, the movie content 1272 is read from the approach movie 127 based on the approach movie name 1267 (step S35). Next, the window 104 (refer to FIG. 12) for reproducing the approach movie is generated, and a process for reproducing the movie content 1272 is performed by using the window. That is, the approach movie is reproduced (step S36).

Subsequently, whether or not the reproduction of the movie content 1272 is completed is determined (step S37). When a result of the determination indicates that the reproduction has not been completed (NO in step S37), the process is returned to step S36, and the process for reproducing the movie content 1272 is continued. When the reproduction of the movie content 1272 is completed (YES in step S37), the approach movie reproduction process is ended.

Returning to FIG. 26, after the process step of step S20 or step S21 is performed, whether or not the game main process is to be ended is determined (step S22). When the determination represents YES, the game main process is ended, and when the determination represents NO, the process is returned to step S15, and the process is repeated. This is the end of the game main process.

Figure 28:
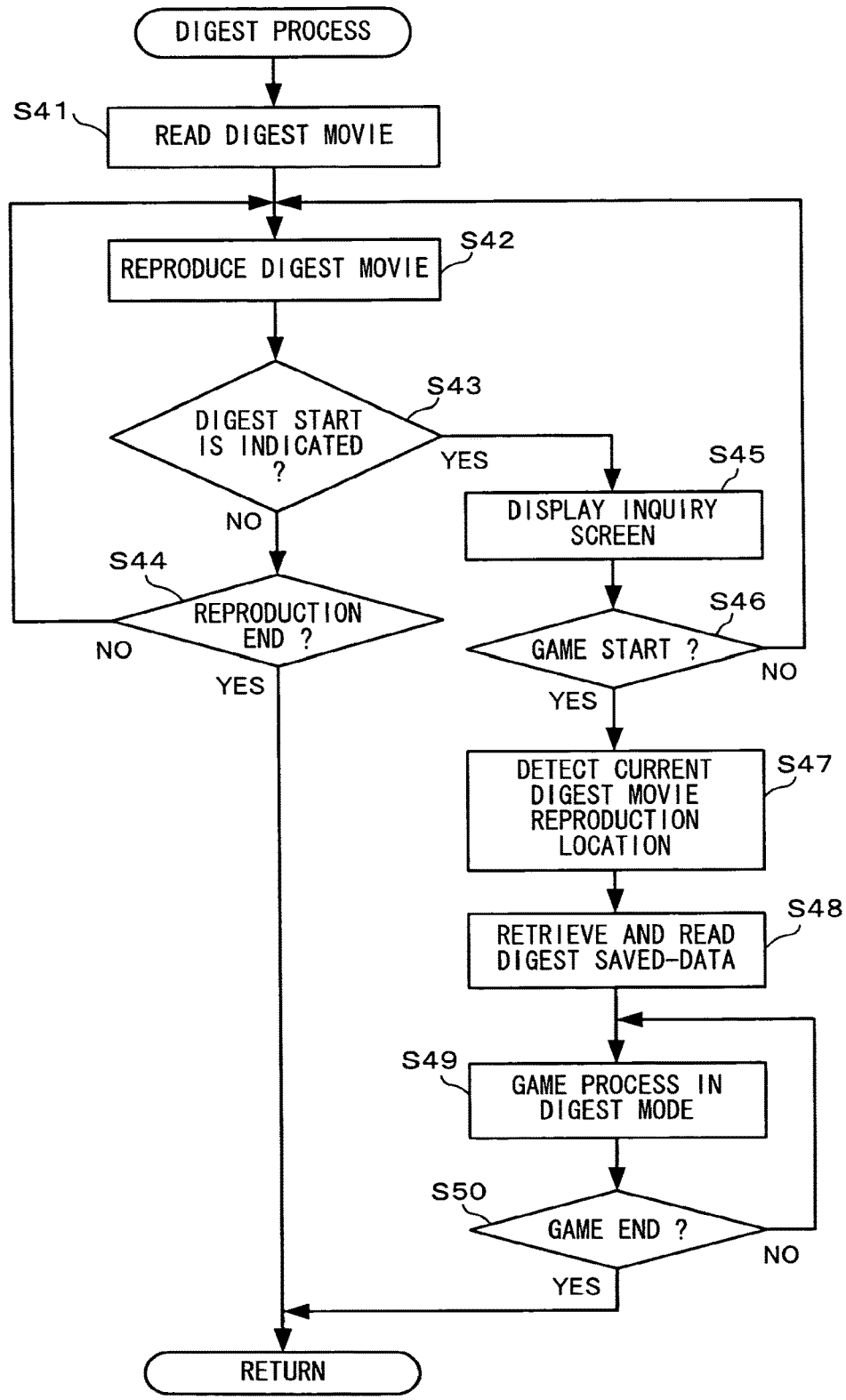
FIG. 28 is a flow chart showing in detail a digest process of step S5 shown in FIG. 25.

Next, the digest process of step S5 will be described in detail with reference to a flow chart shown in FIG. 28. In FIG. 28, firstly, the digest movie 128 is read from the external main memory 12 (step S41).

Next, a screen for digest as shown in FIG. 13 is generated, and the process for reproducing the digest movie is performed (step S42). The reception of an input from a player is simultaneously started.

Next, whether or not a player presses a predetermined button, such as the operation button 72d, while the digest movie is being reproduced is determined (step S43). Hereinafter, the input is referred to as a digest start instruction, and starting a game from halfway while the digest movie is being reproduced is referred to as a digest start. When a result of the determination indicates that the digest start instruction is not issued (NO in step S43), whether or not the reproduction of the digest movie is completed is then determined (step S44). When the reproduction of the digest movie has not been completed (NO in step S44), the process is returned to step S42, and the reproduction of the digest movie is continued.

On the other hand, when the digest start instruction is issued (YES in step S43), an inquiry screen, as shown in FIG. 14, for inquiring whether or not the digest start is to be made is then displayed, and the input from the player is received (step S45). At this time, the reproduction of the digest movie is stopped. When the player makes an input in response to the screen, whether or not the input content indicates an instruction for "digest start" (for example, whether or not "YES" is selected on the screen shown in FIG. 14) is determined (step S46). When a result of the determination indicates that the input content does not indicate an instruction for "digest start" (NO in step S46), the process is returned to step S42, and the reproduction of the digest movie is continued. On the other hand, when a result of the determination indicates that the input content indicates an instruction for "digest start" (YES in step S46), a reproduction position at which the digest movie is being currently reproduced is detected (step S47). An elapsed time from the start of the reproduction of the digest movie is acquired, and the reproduction position at which the digest movie is being currently reproduced is detected based on the elapsed time.

Next, the digest saved-data corresponding to the detected reproduction position is retrieved and read (step S48). Specifically, the digest movie correspondence table 129 is accessed, so as to retrieve the digest saved-data name 1293 satisfying a condition that the acquired elapsed time (that is, the current reproduction position) is greater than or equal to the reproduction from-time 1291 and smaller than the reproduction to-time 1292. In the example shown in FIG. 21, when, for example, the digest start is made when four minutes has passed from the reproduction start, "digest saved-data 04" is detected. The data content 1302 is read, as a part of the progress information 133 of the work area 132, from the digest saved-data 130, based on the digest saved-data name 1293.

Next, the game process in the digest mode described above is started based on the digest saved-data having been read (step S49). That is, the game process is performed in a state where no saving is allowed. In other words, in the digest mode, when an operation for saving is performed while the game is being played, nothing is performed and information that no saving is allowed is displayed, or a display for saving is not performed so as to prevent a user from performing an operation for saving.

Next, whether or not an instruction for ending a game in the digest mode is issued is determined (step S50). When no instruction for ending is issued (NO in step S50), the process is returned to step S49, and the game process in the digest mode is continued. When the instruction for ending is issued (YES in step S50), the digest process is ended.

Figure 29:
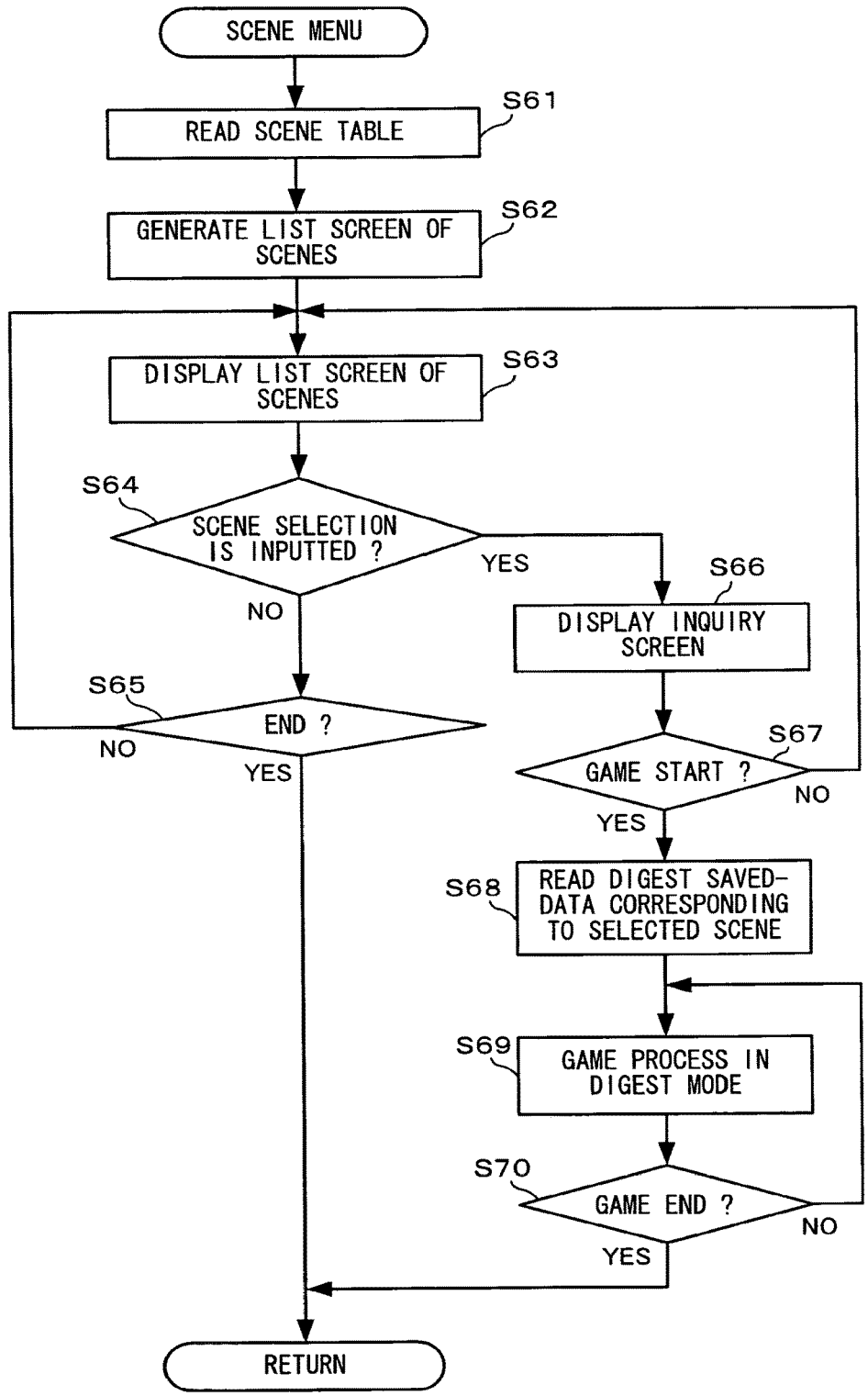
FIG. 29 is a flow chart illustrating in detail a scene menu process of step S7 shown in FIG. 25.

Next, the scene menu process of step S7 will be described in detail with reference to a flow chart shown in FIG. 29. In FIG. 29, firstly, the scene table 131 is read from the external main memory 12 (step S61).

Next, a screen (refer to FIG. 15) for listing and displaying the scenes in the game is generated based on the scene table 131 (step S62). The list screen is displayed, and an input from a user is received (step S63). At this time, when the list screen is initially displayed, a cursor is designating scene 001 displayed at the top of the screen. Further, the introduction movie 1315 for introducing the opening portion of the scene designated by the cursor is read and reproduced.

When a user makes an input on the list screen, whether or not the input content represents an input for selecting one of the scenes is determined (step S64). When a result of the determination indicates that no scene is selected (NO in step S64), whether or not an instruction for ending the scene menu is inputted is subsequently determined (step S65). When a result of the determination indicates that no instruction for ending is issued (NO in step S65), the process is returned to step S63, and when the instruction for ending is issued (YES in step S65), the scene menu process is ended.

On the other hand, when it is determined in step 64 that one of the scenes is selected (YES in step S64), an inquiry screen as shown in FIG. 16 is then displayed, and an input from a player is received (step S66). When a player makes an input in response to the inquiry screen, whether or not the input content indicates an instruction for "game start" (for example, whether or not "YES" is selected on the screen shown in FIG. 16) is determined (step S67). When a result of the determination indicates that the input content does not indicate an instruction for "game start" (NO in step S67), the process is returned to step S63, and the list screen is displayed. On the other hand, when the input content indicates an instruction for "game start" (YES in step S67), the digest saved-data name 1314 corresponding to the selected scene is acquired from the scene table 131. The data content 1302 is retrieved from the digest saved-data 130 based on the digest saved-data name 1314, and is read as a part of the progress information 133 of the work area 132 (step S68).

Next, similarly to the process of step S49, the game process is started in the digest mode based on the digest saved-data having been read (step S69).

Next, whether or not the instruction for ending the game in the digest mode is issued is determined (step S70). When no instruction for ending is issued (NO in step S70), the process is returned to step S69, and the game process in the digest mode is continued. When the instruction for ending is issued (YES in step S70), the scene menu process is ended.

As described above, in the present embodiment, when a player cannot find how to solve the "puzzle" which is set in the game, the player is allowed to view, in the scene, moving images for indicating how to solve the puzzle when the player desires to. Therefore, a player that cannot find how to solve the "puzzle" may not become stuck with the game, and reduction, due to the puzzle being unsolved, in motivation for clearing the game may be prevented. Thus, a player unaccustomed to a game or a player that does not have a lot of time for game play is allowed to play and clear the game to the end. Further, how to solve the "puzzle" is indicated as "moving images" by using an actual example in which the puzzle is actually solved, and therefore a player knows, for certain, how to actually move (operate) the player character. Therefore, for example, a player that cannot know, from a hint represented by only character information, how to solve the puzzle may not become stuck with the game, and may be allowed to play the game to the end.

Further, a content (the scenario or the story) of the game can be roughly known from the digest movie, and further the game can be played from a desired scene in the digest movie. Thus, even when the game is started from the middle of the digest, a player knows the flow of the preceding story or the like, and therefore a state where a player does not know the storyline preceding the middle of the story can be prevented and the player is allowed to play the game in natural manner. Thus, even a player that does not have a lot of time for playing a large volume of game can easily enjoy the large volume of game. Further, also when the game is started from the middle of the digest movie or the game is started from halfway by selecting the "scene menu", a player may enjoy playing the game without becoming stuck with the game because the digest saved-data in which parameters of the player character and the like are previously set in accordance with each scene is read for the game play.

An image quality of the approach movie may be reduced as compared to a general game screen. For example, when a frame rate of a general game screen is set to 60 fps, a frame rate of the approach movie may be set to 15 fps. Further, the resolution of the approach movie may be set so as to be reduced. That is, the "visual quality" of the approach movie may be set so as to be degraded as compared to an actual game screen. Thus, a player is prevented from being satisfied by viewing, in the approach movie, a scene in which the puzzle is solved. A player that desires to view, with increased image quality, the scene in which the puzzle is solved may think that the player needs to operate and play the game by him/herself, so that the player may keep his/her motivation for the game play.

Further, while the approach movie is being reproduced, the game process may be temporarily stopped, or a player may be allowed to operate the player character. Further, when the game process is temporarily stopped, the approach movie may be displayed full-screen.

Further, in the embodiment described above, when the hint button 102 is pressed in the scene in which the "puzzle" is set, the approach movie is reproduced. Also when the hint button is pressed at a location other than a specific location in which the "puzzle" is set, the approach movie corresponding to the "puzzle" set at the specific location which is closest to the location, in the virtual game space, at which the hint button is pressed, may be reproduced.

Further, instead of reproducing the moving images, the approach movie may be provided such that operation data representing the same movement as a movement of the player character in the approach movie is previously generated, and the player character is moved in a window for reproducing the approach movie, based on the operation data. The size of a file can be reduced as compared to a case where a moving image file is reproduced.

Moreover, the content of the approach movie may represent, as moving images, a content (game approach information) useful for continuing the game in addition to a method for solving a predetermined puzzle (trick). For example, the content of the approach movie may be moving images for indicating how to fight against a boss character which is eliminated only by attacking a predetermined weak point. Further, for example, the content of the approach movie may be moving images indicating rocks to be pressed, and the order in which the rocks are to be pressed, so as to jump over a valley in which a lot of rocks to be pressed are scattered. In other words, any approach movie representing game approach information for preventing the game from becoming stuck may be used. When such approach information represents an actual movement of a player character, a player may not become stuck with the game. As a result, a player unaccustomed to a game or a player that does not have a lot of time for game play may smoothly play the game, and continue to play a large volume of game to the end so as to clear the game.

Further, the use of the digest saved-data may not be allowed for a certain initial time period (immediately after the game is purchased). For example, although the digest saved-data cannot be used immediately after the game is purchased, a plurality of pieces of the digest saved-data may be gradually used in accordance with a time period in which the game has been played. In this case, the digest saved-data are set so as not to be used when the game is shipped. The flash memory 17 of the game apparatus body 3 purchased by a player stores the total cumulative time period obtained by adding the time periods in which the game has been played. The total cumulative time period during which the game has been played is read from the flash memory 17 every time the game is started, and when the total cumulative time period during which the game has been played is greater than a predetermined time period, the use of the digest saved-data may be allowed. Thus, the ending portion of the game cannot be played from the beginning, so that a player may not reduce his/her interest in the game, and when a user, who cannot continue the game, almost gives up the game halfway, the use of the digest saved-data is allowed, thereby enhancing the motivation of the player. The use of the digest saved-data may be allowed when a predetermined time period has passed from the release date of the game, or from a date on which the game is played for the first time as well as the use of the digest saved-data may be allowed based on the total time period during which the game has been played. Thus, the digest saved-data can be used regardless of the play time of each player, and therefore, when a predetermined time period has passed, a player who desires to clear the game by him/herself at first but has stopped playing the game halfway, or the like, is allowed to use the digest saved-data for playing the game to the end. Further, most of the users may desire to clear the game by him/herself immediately after the release date, and therefore when the increased number of the users have cleared the game, the digest saved-data can be used, so that a user who desires to clear the game by him/herself may not lose his/her interest in the game.

Further, the "digest" is set so as not to be selected from the title menu shown in FIG. 8 for a certain initial time period. Only when the predetermined time period as described above has passed, the "digest" may be selected from the title menu shown in FIG. 8.

Further, the digest saved-data may not be stored in the optical disc 4, and may be distributed through the network. In this case, a server for storing and distributing the digest saved-data is provided. The game apparatus body 3 is allowed to access the server by using the wireless communication module 18 of the game apparatus body 3 through, for example, the Internet. The digest saved-data may be downloaded from the server, and stored in the flash memory 17. Alternatively, the digest saved-data may not be stored in the flash memory 17, and may be used only when the game apparatus body 3 is connected to the network. For example, when the "scene menu" is selected from the title menu shown in FIG. 8, the game apparatus body 3 may be automatically connected to the network. The digest saved-data is acquired from the server, and the screen as shown in FIG. 15 may be displayed based on the digest saved-data. Also in this case, the ending portion of the game is not allowed to be played from the beginning, so that a player may not reduce his/her interest in the game.

Further, when the digest saved-data is distributed from the server, the distribution time may be set such that the digest saved-data is sequentially distributed after a predetermined time period has passed from the release date of the game. Thus, the digest saved-data can be distributed regardless of the play time of each player, and, therefore, for example, even a player who desires to clear the game by him/herself at first but has stopped playing the game halfway, can download the digest saved-data from the server after the predetermined time period has passed, so that the player may play the game to the end. Further, the digest saved-data is distributed after a predetermined time period has passed from the release date, and therefore it is easier to play the game to the end.

Further, only when a player clears the game at least once, the use of the digest saved-data may be allowed. Thus, it is possible to prevent a player who has cleared the game by him/herself from reducing his/her interest in the game. Further, before the predetermined time period as described above has passed, the digest saved-data may be used only when the game has been cleared, and after the predetermined time period as described above has passed, the digest saved-data may be used even when the game has not been cleared. Thus, a user who desires to clear the game by him/herself is allowed to have an advantage that the user is allowed to view the digest at any time, and play a desired scene.

Further, the "approach movie" described above as well as the digest saved-data may be distributed through the network. Also in this case, the "approach movie" may be downloaded only when a predetermined time period based on the play time or the like has passed. Thus, a player who has become stuck with the game and has given up clearing the game may play the game again.

Furthermore, the flash memory 17 or the like stores an operation history of a game play of each player, and each player may be allowed to create his/her own "approach movie" based on the operation history. The "approach movie" created by each player may be uploaded to the server. When the hint button 102 is pressed, the server may be accessed so as to view the "approach movies" created by various players. Thus, when, for example, a plurality of methods may be considered as a method for approaching a scene in the game, a plurality of approach methods including an approach method for which a skilled operation is required, a method in which an approach is made in a relatively easy operation, and the like may be viewed. It is possible to provide each player with information about an approach method which meets, for example, a skill of the each player for game play. As a result, a player may be prevented from becoming stuck with the game for increased certainty. Further, when it is possible to create and upload his/her own "approach movie", a player can enjoy introducing his/her skill in the game approach to another player, and the game becomes more enjoyable.

Further, each player may be allowed to edit the moving images in various manners when creating his/her own "approach movie" (for example, character representing comments or the like of the player may be included and simultaneously displayed in the moving images). Thus, it is possible to create and upload the "approach movie" based on the individual character of each player in addition to simple creation and upload of the "approach movie". As a result, it is possible to view various "approach movies" based on the individual character of each player, thereby enhancing interest in the game.

Furthermore, the game apparatus of the present embodiment is similarly applied as a game apparatus incorporating a monitor, and a personal computer and a workstation functioning as a game apparatus by executing the game program, and the like.

While the embodiment presented herein has been described in detail, the foregoing description is in all aspects illustrative and not restrictive. It is understood that numerous other modifications and variations can be devised without departing from the scope of the embodiment.

What is claimed is:

1. A game system including one or more first game apparatuses, a second game apparatus and a server connected to the one or more first game apparatuses and the second game apparatus through a network, wherein
    a first game apparatus comprises a first computer processor configured to perform at least:
    executing a game process in accordance with a first user's operation on the first game apparatus;
    storing in a first storage a moving image representing a series of scenes in the executed game process; and
    transmitting the stored moving image to the server; wherein the server:
    receives the moving image transmitted by the first game apparatus;
    stores in a second storage the received moving image from the first game apparatus; and
    transmits the received moving image to the second game apparatus in accordance with a second user's operation on the second game apparatus; wherein
    the second game apparatus includes a second computer processor configured to perform at least:
    receiving the moving image transmitted from the server;
    storing the received moving image in a third storage;
    reading from the third storage the stored received moving image and reproducing the received moving image;
    receiving a second user's operation input on the second game apparatus during the reproducing of the received moving image, and
    switching from reproducing the received moving image to performing a game process according with a second user's operation when receiving the second user's operation input.

2. The game system according to claim 1, wherein the first user may edit the moving image stored in the first storage.

3. The game system according to claim 2, wherein the edited moving image may include characters representing comments of the first user.

4. The game system according to claim 2, wherein the edited moving image may include a text image.

5. The game system according to claim 1, wherein the server receives a plurality of moving images from a plurality of first game apparatuses.

6. The game system according to claim 1, wherein the server is connected to the first game apparatus and the second game apparatus via the internet.

7. The game system according to claim 1, wherein
    the moving image stored in the first game apparatus and transmitted to the server includes an image involving a player character;
    the moving image received by the second game apparatus includes an image involving the player character;
    reproduction of the received moving image includes the player character; and performance of the game process according with the second user's operation includes control of the player character.

8. The game system according to claim 1, wherein
a same player character is included in the reproduction of the received moving image and is controlled in the game process according to the second user's operation input.

9. A first game apparatus comprising a computer processor configured to perform at least:
receiving a moving image from a server, the moving image representing a series of scenes in an executed game process executed by a second user, in accordance with a second user's operation on a second game apparatus connected to the first game apparatus and to the server through a network, the moving image transmitted to the server by the second game apparatus;
storing the received moving image in a first storage;
reading from the first storage the stored received moving image and reproducing the received moving image;
receiving a first user's operation input on the first game apparatus during the reproducing of the received moving image; and
switching from reproducing the received moving image to performing a game process according with a first user's operation when receiving the first user's operation input.

10. The first game apparatus according to claim 9, wherein
the moving image received by the first game apparatus includes an image involving a player character;
reproduction of the received moving image includes the player character; and
performance of the game process according with the first user's operation includes control of the player character.

11. The first game apparatus according to claim 9, wherein
a same player character is included in the reproduction of the received moving image and is controlled in the game process according to the first user's operation.

12. A non-transitory computer-readable storage medium having stored therein a game program executed by a computer of a first game apparatus for performing a game process in accordance with a first user making an operation input so as to play a game,
the game program causing the computer to perform at least:
receiving a moving image from a server, the moving image representing a series of scenes in an executed game process executed by a second user, in accordance with a second user's operation on a second game apparatus connected to the first game apparatus and to a server through a network, the moving image transmitted to the server by the second game apparatus;
storing the received moving image in a first storage;
reading from the first storage the stored received moving image and reproducing the received moving image;
receiving a first user's operation input on the first game apparatus during the reproducing of the received moving image; and
switching from reproducing the received moving image to performing a game process according with a first user's operation when receiving the first user's operation input.

13. The non-transitory computer-readable storage medium according to claim 12, wherein
the moving image received by the first game apparatus includes an image involving a player character;
reproduction of the received moving image includes the player character; and
performance of the game process according with the first user's operation includes control of the player character.

14. The non-transitory computer-readable storage medium according to claim 12, wherein
a same player character is included in the reproduction of the received moving image and is controlled in the game process according to the first user's operation.

15. A method for performing a game process from a predetermined point in a series of scenes in an executed game process wirelessly received through a network, the method comprising:
each of a plurality of first game apparatuses performing:
executing a game process in accordance with a first user's operation on the first game apparatus;
storing in a first storage a moving image representing a series of scenes in the executed game process; and
transmitting the stored moving image to a server;
the server performing at least:
receiving a plurality of moving images transmitted by the plurality of first game apparatuses;
storing in a second storage the received plurality of moving images by the plurality of first game apparatuses; and
transmitting the plurality of received moving images to a second game apparatus in accordance with a second user's operation on the second game apparatus;
the second game performing at least:
receiving the plurality of moving images transmitted by the server;
storing the received plurality of moving images in a third storage;
reading from the third storage the stored received plurality of moving images and reproducing the received moving images;
receiving a second user's operation input on the second game apparatus during the reproducing of the received moving images, and
switching from reproducing the received moving images to performing a game process according with a second user's operation when receiving the second user's operation input.

16. The method according to claim 15, wherein
the moving image stored in the first game apparatus and transmitted to the server includes an image involving a player character;
the moving image received by the second game apparatus includes an image involving the player character;
reproduction of the received moving image includes the player character; and
performance of the game process according with the second user's operation includes control of the player character.

17. The method according to claim 15, wherein
a same player character is included in the reproduction of the received moving image and is controlled in the game process according to the second user's operation.

* * * * *